US012639850B2

(12) United States Patent
Maji et al.

(10) Patent No.: US 12,639,850 B2
(45) Date of Patent: May 26, 2026

(54) NEURAL NETWORK TECHNIQUES FOR PREDICTING OBJECT POSES BASED ON PARAMETERIZED AND NON-PARAMETERIZED ROTATION AND TRANSLATION VECTORS

(71) Applicant: TEXAS INSTRUMENTS INCORPORATED, Dallas, TX (US)

(72) Inventors: Debapriya Maji, Asansol (IN); Soyeb Nagori, San Diego, CA (US); Deepak Poddar, Bangalore (IN); Manu Mathew, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 377 days.

(21) Appl. No.: 18/355,594

(22) Filed: Jul. 20, 2023

(65) Prior Publication Data

US 2024/0153139 A1 May 9, 2024

(30) Foreign Application Priority Data

Nov. 9, 2022 (IN) .............................. 202241063922

(51) Int. Cl.
| | |
|---|---|
| *G06T 7/73* | (2017.01) |
| *G06N 3/045* | (2023.01) |
| *G06T 7/50* | (2017.01) |

(52) U.S. Cl.
CPC ...... *G06T 7/75* (2017.01); *G06T 2207/20081* (2013.01); *G06T 2207/20084* (2013.01)

(58) Field of Classification Search
CPC .......... G06N 3/02; G06N 3/045; G06N 3/084; G06N 3/088; G06N 3/0455; G06N 3/0499; G06N 3/09; G06T 2207/20081; G06T 2207/20084; G06T 7/73; G06T 7/75;
(Continued)

(56) References Cited

U.S. PATENT DOCUMENTS

| | | | |
|---|---|---|---|
| 2021/0174543 A1* | 6/2021 | Claessen ................... | G06T 7/75 |
| 2022/0405448 A1* | 12/2022 | Mezghanni ........... | G06N 3/084 |
| 2023/0137337 A1 | 5/2023 | Maji et al. | |

OTHER PUBLICATIONS

Bukschat et al. "EfficientPose: An efficient, accurate and scalable end-to-end 6D multi object pose estimation approach." Pub Date: Nov. 18, 2020. (Year: 2020).*
(Continued)

*Primary Examiner* — Chad Dickerson
(74) *Attorney, Agent, or Firm* — Carl G. Peterson; Frank D. Cimino

(57) ABSTRACT

Disclosed herein are systems and methods that provide an end-to-end approach for performing multi-dimensional object pose estimation in the context of machine learning models. In an implementation, processing circuitry of a suitable computer inputs image data to a machine learning model that predicts a parameterized rotation vector and a parameterized translation vector for an object in the image. Next, the processing circuitry converts the parameterized rotation vector and the parameterized translation vector into a non-parameterized rotation vector and a non-parameterized translation vector respectively. Finally, the processing circuitry updates the image data based on the non-parameterized rotation vector and the non-parameterized translation vector.

20 Claims, 15 Drawing Sheets

(58) Field of Classification Search
CPC . G06T 7/50; G06F 30/17; G06F 30/27; G06F
30/045
USPC ........................................................ 382/103
See application file for complete search history.

(56) References Cited

OTHER PUBLICATIONS

Xiang et al. "PoseCNN: A CNN for 6D Object Pose Estimation in Cluttered Scenes". Pub Date: May 26, 2018. (Year: 2018).*

* cited by examiner

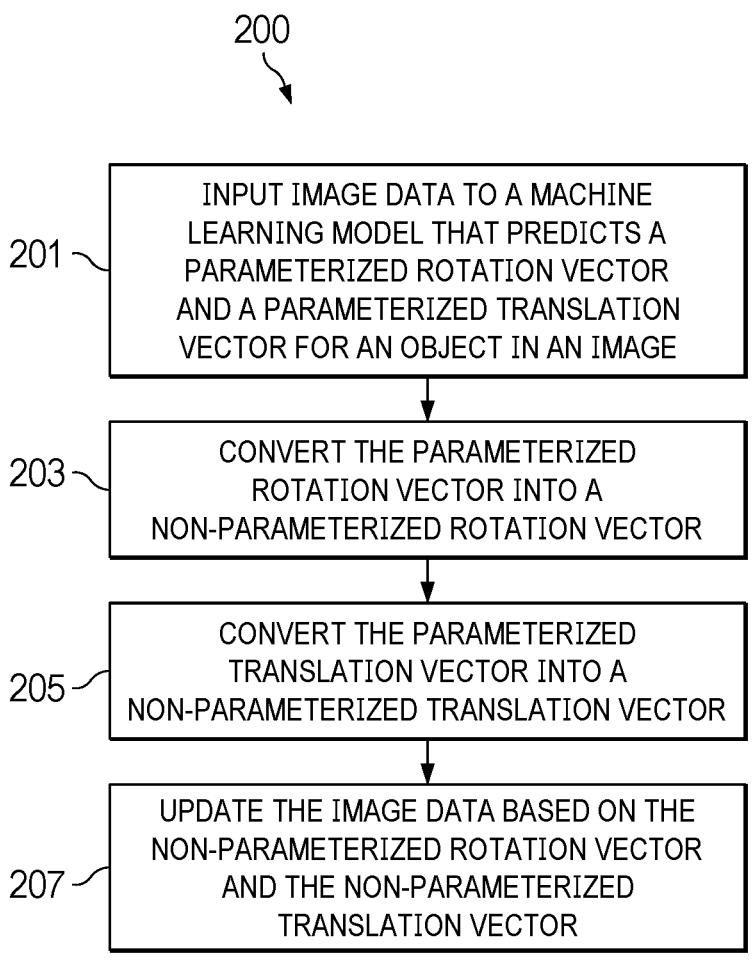

200

201 — INPUT IMAGE DATA TO A MACHINE LEARNING MODEL THAT PREDICTS A PARAMETERIZED ROTATION VECTOR AND A PARAMETERIZED TRANSLATION VECTOR FOR AN OBJECT IN AN IMAGE

203 — CONVERT THE PARAMETERIZED ROTATION VECTOR INTO A NON-PARAMETERIZED ROTATION VECTOR

205 — CONVERT THE PARAMETERIZED TRANSLATION VECTOR INTO A NON-PARAMETERIZED TRANSLATION VECTOR

207 — UPDATE THE IMAGE DATA BASED ON THE NON-PARAMETERIZED ROTATION VECTOR AND THE NON-PARAMETERIZED TRANSLATION VECTOR

$$L_{total} = L_{ADD(s)} + L_{rot} + L_{oks} + L_{ARD}$$

703

$$L_{ADD(s)} = L_{asym} = \frac{1}{m} \sum_{x \in m} \|\left(\frac{(R_p x + t_p) - (R_g x + t_g)}{d_m}\right)\|_2$$

OR $$L_{ADD(s)} = L_{sym} = \frac{1}{m} \sum_{x_1 \in m} \min_{x_2 \in m} \|\left(\frac{(R_p x_1 + t_p) - (R_g x_2 + t_g)}{d_m}\right)\|_2$$

705

$$L_{rot} = (1 - R_{.1g}^T \bullet R_{.1p}) + (1 - R_{.2g}^T \bullet R_{.2p})$$

707

$$L_{oks} = 1 - OKS = 1 - \exp\left(\frac{d^2}{2s^2 k^2}\right)$$

709

$$L_{ARD} = \left| \frac{t_{zg} - t_{zp}}{t_{zg}} \right|$$

FIG. 7

NEURAL NETWORK TECHNIQUES FOR PREDICTING OBJECT POSES BASED ON PARAMETERIZED AND NON-PARAMETERIZED ROTATION AND TRANSLATION VECTORS

CROSS-REFERENCE TO RELATED APPLICATION

The present application claims priority to Indian Provisional Application No. 202241063922, filed on Nov. 9, 2022 which is hereby incorporated herein by reference in its entirety.

TECHNICAL FIELD

Aspects of the disclosure are related to the field of computer hardware and software, and to performing multidimensional monocular object pose estimation in the context of neural networks.

BACKGROUND

Machine learning models may be employed in a variety of contexts to perform a variety of tasks. For example, a machine learning model may be employed by a computer vision system to perform object pose estimation. In this context, the machine learning model will receive a two-dimensional (2D) image of a three-dimensional (3D) object to estimate the location and orientation of said object in space. More specifically, the machine learning model will determine the relative location and orientation of the object with respect to the device that captured the 2D image.

Traditional approaches to perform object pose estimation are executed in two stages. The first stage comprises keypoint detection, where the machine learning model detects important key points of the object in the image. The second stage comprises a Perspective-n-Point (PnP) network that estimates an initial pose for the object based on the detected key-points. However, PnP is not an end-to-end approach, and must be run for each object in the image.

In most traditional approaches, rotation refinement techniques are utilized to improve the accuracy of the machine learning model. In these approaches, a network may iteratively refine an initial pose estimation by matching the rendered image against the observed image and/or by using an iterative closest point approach. Consequently, most rotation refinement techniques are computationally expensive, making such techniques difficult to integrate into real-world applications. For example, applications which require multiple machine learning models to be employed at once. Alternatively, traditional approaches which exclude rotation refinement techniques do not provide a strong enough estimate for the pose of an object.

End-to-end approaches such as EfficientPose for performing object pose estimation via a machine learning model also exist. Unfortunately, these approaches also rely on computationally expensive rotation refinement networks without any parameterization of the rotation of parameters. As a result, current methods to perform object pose estimation are either weak in forming predictions or require a computationally expensive rotation refinement network.

OVERVIEW

Technology is disclosed herein that provides an end-to-end approach for performing six-dimensional object pose estimation in the context of neural networks that mitigates the number of computations required to perform the estimation, while improving the performance accuracy of the neural network. Various implementations include a computer implemented method for estimating a six-dimensional (6D) pose representation of a three-dimensional (3D) object from a two-dimensional (2D) environment (i.e., image). In an implementation, processing circuitry of a suitable computer inputs image data to a machine learning model that predicts a parameterized rotation vector and a parameterized translation vector for an object in the image. Next, the processing circuitry converts the parameterized rotation vector and the parameterized translation vector into a non-parameterized rotation vector and a non-parameterized translation vector respectively. Finally, the processing circuitry updates the image data based on the non-parameterized rotation vector and the non-parameterized translation vector.

In a first example implementation, a machine learning model is trained to predict parameterized rotation vectors and parameterized translation vectors for 3D objects in a 2D image. The parameterized rotation vectors are comprised of six parameters which are representative of the rotation of a respective object in the image. The parameterized translation vectors are comprised of three parameters which are representative of the position of a respective object in the image. In operation, the machine learning model receives image data to predict the parameterized rotation vectors and the parameterized translation vectors for the objects in the image.

In a second example, the machine learning model of the first example, when deployed, may convert the parameterized rotation vectors and the parametrized translation vectors into non-parameterized rotation vectors and non-parameterized translation vectors. Non-parameterized rotation vectors are comprised of three elements which describe the rotation of a respective object in the image. Non-parameterized translation vectors are also comprised of three elements but describe the position of a respective object in the image.

In a third example, the machine learning model of the second example outputs updated image data such that the updated image data includes a cuboid for each object captured by the input image. The cuboid for an object is representative of an outline, surrounding the object, that describes the rotation and translation of that object. In an implementation, the cuboid for each object is generated based on the respective non-parameterized rotation vector and non-parameterized translation vector of that object. In operation, the machine learning model outputs updated image data, such that the updated image data is representative of an updated input image that includes cuboids for each object in the input image.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

FIG. 2 illustrates a method for object pose estimation in an implementation.

FIG. 7 illustrates an example loss function in an implementation.

DETAILED DESCRIPTION

Figure 1A:
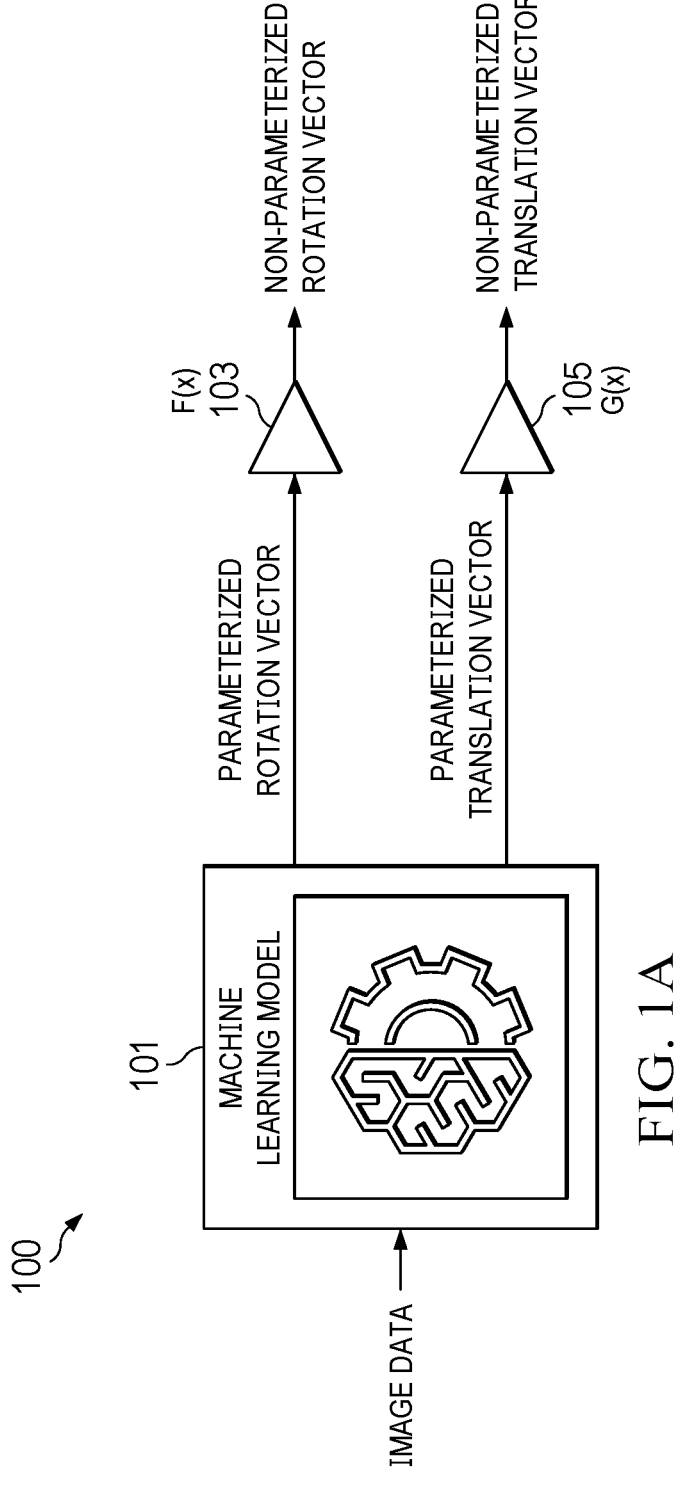
FIG. 1A illustrates a runtime architecture in an implementation.

Systems, methods, and devices are disclosed herein which provide an end-to-end approach for performing multi-dimensional object pose estimation in the context of machine learning models. The disclosed technique(s) may be implemented in the context of hardware, software, firmware, or a combination thereof to provide a method of object pose estimation that mitigates the number of computations required to perform the estimation, while improving the performance accuracy of the machine learning model. In various implementations, a suitable computing system employs a trained machine learning model to perform six-dimensional (6D) object pose estimation.

In an embodiment, processing circuitry described herein inputs image data to a machine learning model. The image data received by the machine learning model is representative of a two-dimensional (2D) image of at least one three-dimensional (3D) object. The image data may be collected by an associated system that includes an image capturing device. For example, a computer-vision system that includes a camera.

Image data collected by the associated system is passed through the layers of the machine learning model to predict a parameterized rotation vector and parameterized translation vector for each object represented by the image data. In an implementation, the parameterized rotation vector for an object is comprised of six parameters or elements that describe a representation of the object's rotation. For example, such parameters may describe the rotation coordinates of the object. Meaning, the parameterized rotation vector does not describe the actual rotation of the object, but rather a parameterized version of the object's rotation. Alternatively, the parameterized translation vector for an object is comprised of three parameters or elements that describe a representation of the object's translation. For example, such parameters may describe the translation coordinates of the object. Meaning, the parameterized translation vector does not describe the actual translation of the object, but rather a parameterized version of the object's translation. In an implementation, the machine learning model predicts the parameterized translation vector with respect to the X- and Y-dimensions, separately from predicting the parameterized translation vector with respect to the Z-dimension. Results of the prediction are then combined to produce the parameterized translation vector.

In an implementation, the machine learning model converts the parameterized rotation vector and the parameterized translation vector for each object represented by the image data into corresponding non-parameterized vectors. In another implementation, an engine associated with the machine learning model converts the parameterized vectors into non-parameterized vectors. Non-parameterized rotation vectors are comprised of three elements which predict the object's actual rotation in the X-, Y-, and Z-dimensions. Non-parameterized translation vectors are comprised of three elements which predict the object's actual translation in the X-, Y-, and Z-dimensions.

In an implementation, the machine learning model updates the input image data based on the non-parameterized rotation vector and non-parameterized translation vector for each object in the image. For example, the machine learning model may insert a cuboid around each object in the image, based on the respective non-parameterized vectors. The cuboid is representative of a cube that outlines a respective object in the image. In another implementation, the machine learning model passes the non-parameterized vectors to an associated system. For example, a robotic arm that requires rotation and translation information to pick-up an object.

The end-to-end approaches described herein can use a parameterized version of the pose to achieve competitive performance and accuracy without extra refinement or any further complex post-processing. These approaches may be continuous, in contrast to the discontinuities that may exist in representations in four or fewer dimensions. The continuous 6D representation may achieve a more stable training, as compared to predicting the entire rotation matrix as in EfficientPose. Further improvements in accuracy can be achieved through the design of the loss function and the application of 6D augmentation. In addition, the techniques of this disclosure can benefit from any further advancements in the field of objection detection. Of course, these advantages are merely examples, and no advantage is required for any particular embodiment.

Turning now to the Figures, FIG. 1A illustrates a runtime architecture for performing multi-dimensional object pose estimation in the context of machine learning models, herein referred to as architecture 100. Architecture 100 includes—but is not limited to—machine learning model 101, rotation engine 103, and translation engine 105. Architecture 100 may be implemented in the context of program instructions, employed by a suitable computing system, to perform multi-dimensional object pose estimation. In an implementation, architecture 100 performs 6D object pose estimation. This specification is not intended to limit the number of dimensions of the disclosed technology, but rather to provide an example.

Machine learning model 101 is representative of software which performs the 6D object pose estimation. In an implementation, machine learning model 101 is representative of a deep neural network (DNN) which includes a series of layers, trained to perform object pose estimation. The layers of machine learning model 101 are comprised of interconnected nodes which transfer data from layer to layer. In operation, a node of the first layer of machine learning model 101 receives incoming image data from an associated system. For example, such systems could include a computer vision system, an imaging system, or any system which incorporates a camera. In an implementation, image data collected by the associated system is representative of a 2D image of a 3D object. In other implementations, the image data may be representative of a 2D image of multiple 3D objects. For explanatory purposes, image data capturing a singular 3D object will be discussed with respect to FIG. 1A.

Machine learning model 101 receives image data from the associated system to determine a parameterized rotation vector and parameterized translation vector for the object in the image. The parameterized rotation vector is a representation of the object's rotation parameters within the image. Meaning, the parameterized rotation vector does not comprise the actual parameters of rotation, but rather a representation of the parameters. In an implementation the parameterized rotation vector comprises six parameters to describe the parameterized rotation of the object. The parameterized translation vector is a representation of the object's position within the image. Similar to the parameterized rotation vector, the parameterized translation vector does not comprise the actual parameters of translation, but rather a representation of the parameters. In an implementation, the parameterized translation vector comprises three parameters which describe the offset of the object relative to the anchor box center or the grid box center. More specifically the three parameters describe the offset of the object with respect to the X-dimension, Y-dimension, and Z-dimension. In an implementation, machine learning model 101 determines the offset with respect to the X- and Y-dimensions separately from determining the offset with respect to the Z-dimension.

Rotation engine 103 represents software which converts the parameterized rotation vector into a corresponding non-parameterized rotation vector. Rotation engine 103 receives the parameterized rotation vector from machine learning model 101, and in response rotation engine 103 converts the parameterized rotation vector into the corresponding non-parameterized rotation vector. In an implementation, rotation engine 103 is representative of a discrete function, employed by an associated computing system, to convert the parameterized rotation vector into a non-parameterized format. In another implementation, rotation engine 103 is representative of a discrete function employed by a layer of machine learning model 101, such that the layer is trained to convert the parameterized rotation vector into the non-parameterized format. The non-parameterized rotation vector describes a prediction of the actual parameters of the object's rotation within the image. In an implementation the non-parameterized rotation vector comprises three parameters which describe a prediction the object's rotation in the X-dimension, Y-dimension, and Z-dimension.

Translation engine 105 represents software which converts the parameterized translation vector into a corresponding non-parameterized translation vector. Translation engine 105 receives the parameterized translation vector from machine learning model 101, and in response translation engine 105 converts the parameterized translation vector into the corresponding non-parameterized translation vector. In an implementation, translation engine 105 is representative of a discrete function, employed by the associated computing system, to convert the parameterized translation vector into a non-parameterized format. In another implementation, translation engine 105 is representative of a discrete function employed by a layer of machine learning model 101, such that the layer is trained to convert the parameterized translation vector into the non-parameterized format. The non-parameterized translation vector describes a prediction of the actual parameters of the object's translation within the image. In an implementation the non-parameterized translation vector comprises three parameters that describe a prediction of the object's position in the X-dimension, Y-dimension, and Z-dimension.

Prior to operation, machine learning model 101 is first trained to perform the 6D object pose estimation (later discussed with reference to FIG. 1B). Once trained, architecture 100 deploys machine learning model 101. In operation, machine learning model 101 begins receiving image data from an associated system. For example, machine learning model 101 may receive image data that represents a 2D image of a 3D object from an associated computer vision system. Machine learning model 101 passes the image data through its layers to predict the parameterized rotation vector and parameterized translation vector for the object in the image.

Next, machine learning model 101 passes the parameterized rotation vector and parameterized translation vector to their respective engines. Machine learning model 101 outputs the parameterized rotation vector to rotation engine 103. In response, rotation engine 103 converts the parameterized rotation vector into a non-parameterized rotation vector. Similarly, machine learning model 101 outputs the parameterized translation vector to translation engine 105. In response, translation engine 105 converts the parameterized translation vector into a non-parameterized translation vector.

Figure 1B:
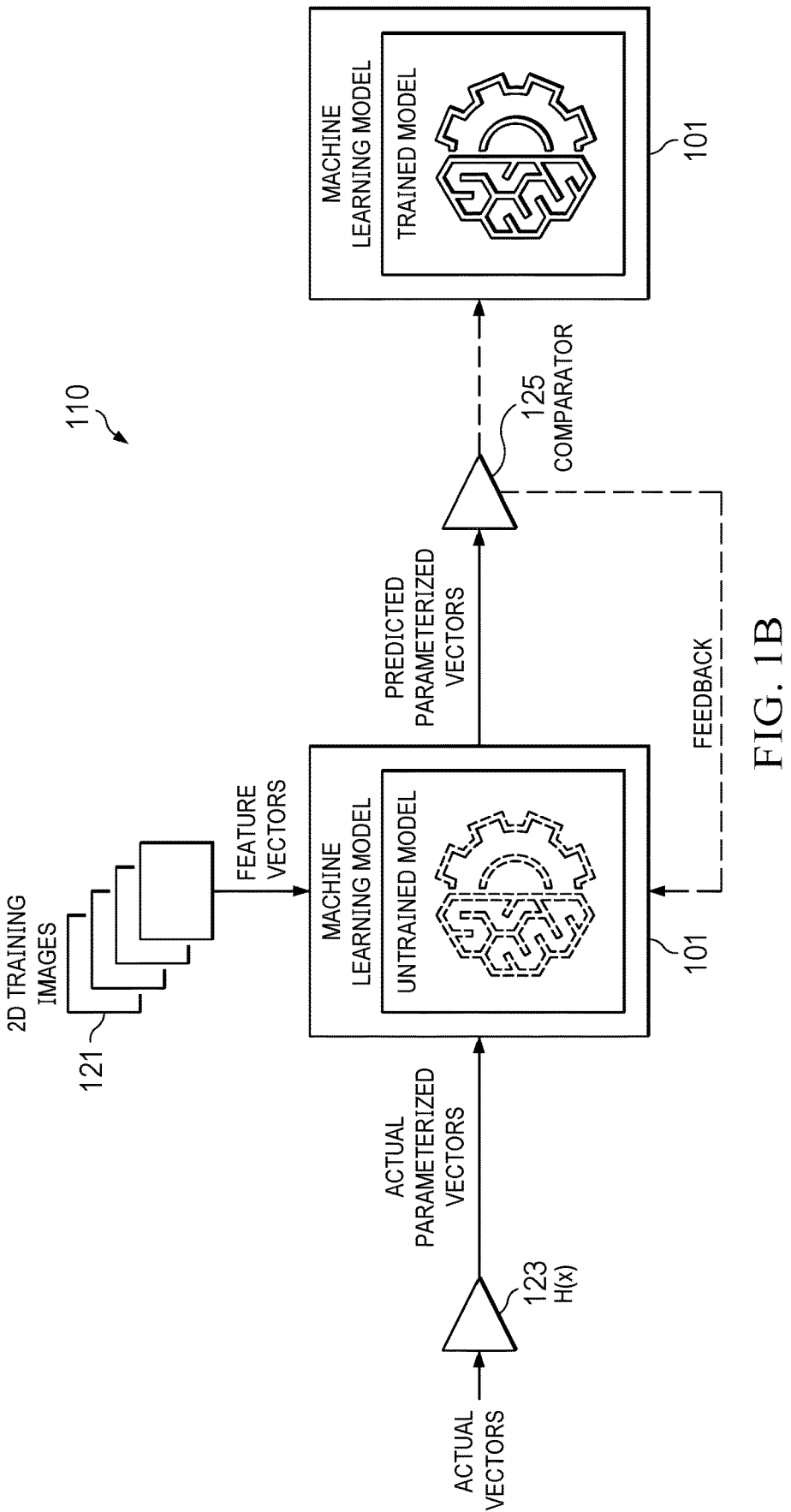
FIG. 1B illustrates a training architecture in an implementation.

Now turning to the next figure, FIG. 1B illustrates a training architecture for machine learning model 101 of FIG. 1A, herein referred to as architecture 110. Architecture 110 includes—but is not limited to—machine learning model 101, training data 121, training engine 123, comparator 125, and machine learning model 101. Architecture 110 may be implemented in the context of program instructions, employed by a suitable computing system, to train a machine learning model to perform multi-dimensional object pose estimation. In an implementation, architecture 110 trains machine learning model 101 to perform 6D object pose estimation. Additional example details of object pose estimation can be found in commonly assigned U.S. Patent Application Publication No. 2023/0137337, entitled "Enhanced Machine Learning Model for Joint Detection and Multi Person Pose Estimation," filed on Jun. 28, 2022, which is incorporated by reference in its entirety.

Training data 121 is representative of the image data used to train a machine learning model to perform 6D object pose estimation (e.g., multi-object 6D pose estimation for each object in an image). The image data of training data 121 is representative of multiple 2D images. In an implementation the multiple 2D images, represented by the image data, are images of 3D objects. For example, training data 121 may include images of a singular 3D object, and images of multiple 3D objects. Objects included in the images of training data 121 are varied to include different objects. Further, objects of training data 121 are represented in multiple fashions, such that training data 121 includes images of the same object at different rotations and translations. In an implementation, images of training data 121 are further varied to increase the sample size of the image data represented by training data 121. For example, images of training data 121 may be augmented to adjust the scale of the image, or the orientation of the image (later discussed with reference to FIGS. 6A-6C).

In an implementation, images represented by training data 121 are effectively labeled to include the actual parameterized vectors of the 3D objects within the images. For example, an image containing multiple objects will be effectively labeled with the actual parameterized rotation vectors and the actual parameterized translation vectors for each object in the image. Actual parameterized vectors describe vectors that were calculated rather than predicted.

In an implementation, the parameterized vectors required to effectively label training data 121 are calculated based on an examination of corresponding 3D computer-aided-design (CAD) models. Prior to training, 3D CAD models of each object are manipulated to represent the objects at varied rotation and translation parameters. In an implementation the images of training data 121 reflect the varied orientations captured by the 3D CAD models. As a result, the rotation parameters and translation parameters of training data 121 are known values.

Training engine 123 represents software which converts the known rotation parameters and translation parameters of training data 121 to the actual parameterized vectors. In an implementation, training engine 123 is representative of a discrete function, employed by an associated computing system, to convert the data. In operation, training engine 123 receives the known parameters, represented as the actual vectors. In response, training engine 123 outputs the actual parameterized vectors to untrained machine learning model 101.

Prior to training, machine learning model 101 is represented as an untrained model. In an implementation, the untrained model must undergo a multitude of training iterations to transition to a trained model. In a first iteration, training data 121 provides image data, representative of an image of an object, to untrained machine learning model 101. Simultaneously, training engine 123 provides the actual parameterized vectors to untrained machine learning model 101 such that the actual parameterized vectors correspond to the image data loaded from training data 121. In response, untrained machine learning model 101 passes the received data through its layers to generate predicted parameterized vectors. The predicted parameterized vectors are then passed on to comparator 125 to generate feedback regarding the accuracy of the untrained model. If untrained machine learning model 101 receives feedback from comparator 125, untrained machine learning model 101 will adjust the weights of the nodes of its layers accordingly and begin a next iteration of training. This process will continue until the untrained model receives no further feedback from comparator 125.

Comparator 125 is representative of hardware configured to compare the predicted parameterized vectors, generated by the untrained model, with the actual parameterized vectors, generated by training engine 123. Comparator 125 has two output options. First, comparator 125 may output feedback to untrained machine learning model 101. Feedback generated by comparator 125 informs the untrained model to adjust the weight coefficients, to better predict the parameterized vectors. Alternatively, comparator 125 may output trained machine learning model 101.

In operation, to begin a first iteration of training, data representative of an image is loaded from training data 121 to the nodes of untrained machine learning model 101. Simultaneously, training engine 123 provides the corresponding parameterized vectors to the untrained model. In response, the untrained model attempts to predict the parameterized rotation vectors for the received image data, solely based on the image data alone. More specifically, untrained machine learning model 101 does not use the actual parameterized vectors, generated by training engine 123, to form a prediction.

Upon generating the predicted parameterized vectors for the received image data, the untrained model outputs the predictions to comparator 125. Comparator 125 performs a comparison between the predicted parameterized vectors and the actual parameterized vectors. If comparator 125 finds the predicted parameterized vectors to be an inaccurate representation of the actual parameterized vectors, then comparator 125 will provide feedback to the untrained model to adjust the weights of its nodes.

After applying the feedback of comparator 125, untrained machine learning model 101 begins a next iteration of training. If comparator 125 provides feedback in the next iteration of training, then another training iteration will be executed, based on the provided feedback. This process is repeated until comparator 125 finds the predicted parameterized vectors to be an accurate representation of the actual parameterized vectors on a consistent basis. In other words, this process is repeated until the weights of untrained machine learning model 101 have been adjusted to accurately predict the parameterized vectors of training data 121.

In a final training iteration, rather than providing feedback, comparator 125 outputs trained machine learning model 101. Once trained, machine learning model 101 may be employed by architecture 100 to predict the parameterized rotation vectors and parameterized translation vectors of incoming image data.

FIG. 2 illustrates a method of performing 6D object pose estimation, herein referred to as method 200. Method 200 may be implemented in the context of program instructions (e.g., machine learning model 101), that, when executed by a suitable processing system (e.g., computing device 801), direct the processing system to operate as follows, referring parenthetically to the steps in FIG. 2.

To begin, the method includes inputting image data representative of a 2D image of a 3D object to a machine learning model (i.e., machine learning model 101) that predicts a parameterized rotation vector and a parameterized translation vector for the object in the image (step 201). The parameterized rotation vector is a representation of the object's rotation in the X-, Y-, and Z-dimensions. The parameterized translation vector is a representation of the object's position in the X-, Y-, and Z-dimensions.

Next, the method continues by converting the parameterized rotation vector into a non-parameterized rotation vector (step 203). The non-parameterized rotation vector describes the object's actual rotation in the X-, Y-, and Z-dimensions. In an implementation the machine learning model converts the parameterized rotation vector into the non-parameterized rotation vector.

Then, the method continues by converting the parameterized translation vector into a non-parameterized translation vector (step 205). The non-parameterized translation vector describes the object's actual position in the X-, Y-, and Z-dimensions. In an implementation the machine learning model converts the parameterized translation vector into the non-parameterized translation vector.

Upon converting the parameterized vectors into non-parameterized vectors, the method continues by updating the image data based on the non-parameterized rotation vector and the non-parameterized translation vector (step 207). In an implementation, the image data is updated to include a cuboid around the object in the image, such that the placement of the cuboid is based on the non-parameterized vectors. In an implementation, the machine learning model updates the image data to include a cuboid for each object in the image.

Figure 3A:
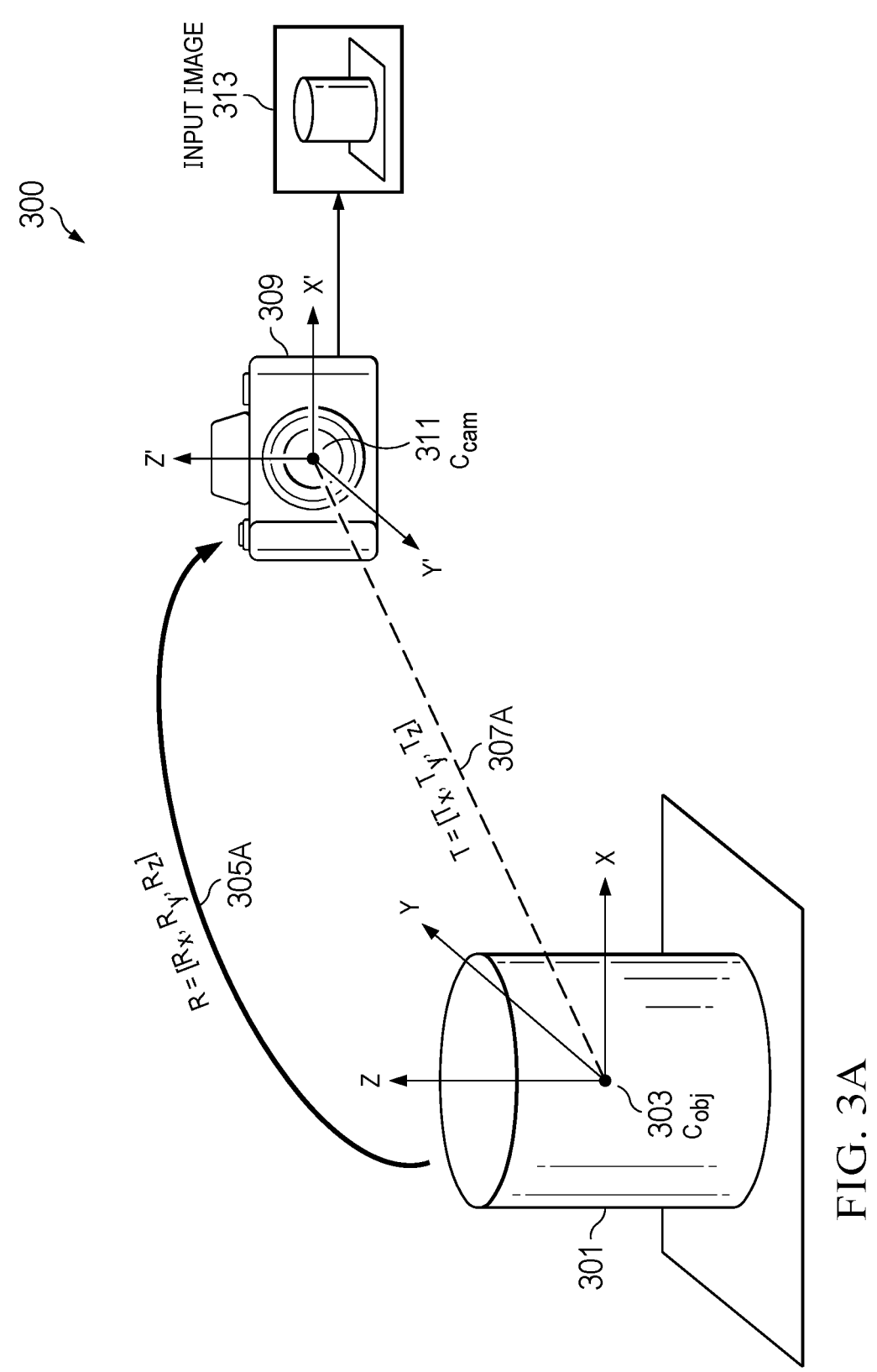
FIG. 3A illustrates an operational environment in an implementation.
Figure 3B:
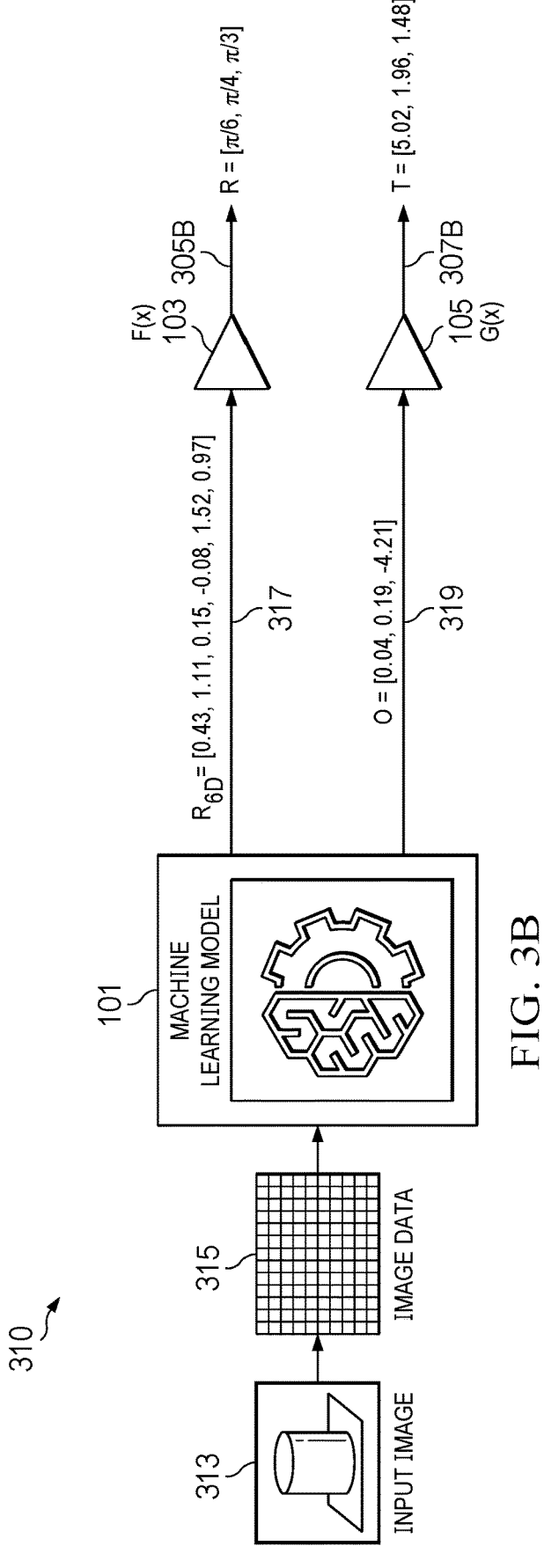
FIG. 3B illustrates an operational scenario in an implementation.

FIGS. 3A and 3B illustrate an operational scenario of method 200 in the context of architecture 100. FIG. 3A illustrates an operational environment for collecting image data, herein referred to as operational environment 300. FIG. 3B illustrates an operational scenario for identifying non-parameterized vectors of an object represented by the image data, herein referred to as operational scenario 310.

Now turning to FIG. 3A, operational environment 300 includes object 301, camera 309, and input image 313. Operational environment 300 may be representative of a system that collects image data for an associated machine learning model. For example, operational environment 300 may be representative of a computer vision system, an imaging system, or any other system which incorporates a camera. In an implementation, operational environment 300 is representative of the system that provides image data to machine learning model 101 of architecture 100.

Object 301 represents the object of interest for a machine learning model performing 6D object pose estimation. For example, object 301 may represent a component on an assembly line that a robotic arm is tasked with picking up. In this context, an imaging system, such as operational environment 300, will capture an image of the component (object 301), and pass the image data to a machine learning model (machine learning model 101). In response, the machine learning model will perform object pose estimation to provide information to the robotic arm on the translation and rotation of the component as it resides on the assembly line.

Object 301 is labeled to include object coordinate system 303. Object coordinate system 303 provides context on to where object 301 is located in operational environment 300. To perform 6D object pose estimation, the associated machine learning model is tasked with estimating the rigid transformation from object coordinate system 303 to camera coordinate system 311. Meaning, the associated machine learning model must accurately predict the rotation and translation parameters of the object in the digital realm (i.e., camera coordinate system 311), by predicting the corresponding parameters in the physical realm (i.e., object coordinate system 303).

The rotation and translation parameters of object 301 are represented by rotation vector 305A and translation vector 307A. Rotation vector 305A describes the rotation parameters of object 301 such that the parameters of rotation vector 305A are represented within object coordinate system 303. Translation vector 307A describes the translation parameters of object 301, such that the parameters of translation vector 307A are also represented within object coordinate system 303. In operation, the associated machine learning model provides a prediction for rotation vector 305A and translation vector 307A, discussed in detail with reference to FIG. 3B.

Camera 309 represents the imaging device which collects image data for an associated machine learning model. For example, camera 309 may capture input image 313 for machine learning model 101. Camera 309 is labeled to include camera coordinate system 311. In operation, camera 309 inputs image data to machine learning model 101 to predict a parameterized rotation vector and a parameterized translation vector for object 301 of input image 313.

Now turning to FIG. 3B, operational scenario 310 includes input image 313, image data 315, and the components of architecture 100, such that the components include machine learning model 101, rotation engine 103, and translation engine 105. Operational scenario may be a representative of a runtime architecture for performing 6D object pose estimation (i.e., architecture 100).

Input image 313 is the image collected by camera 309, while image data 315 is a representation of input image 313. Image data 315 acts as an allowable input to machine learning model 101. In an implementation image data 315 is a matrix, herein referred to as a feature map, that stores pixel values corresponding to the individual pixels of input image 313. For example, such pixel values may include a pixel's red-green-blue (RGB) value, hex value, hue saturation lightness (HSL) value, or color value of the like.

In operation, machine learning model 101 receives image data 315 from camera 309. Next machine learning model 101 predicts a parameterized rotation vector and parameterized translation vector for object 301 of input image 313. Predictions generated by machine learning model 101 are represented by parameterized rotation vector 317 and parameterized translation vector 319.

Parameterized rotation vector 317 represents a parameterized prediction of rotation vector 305A. Parameterized translation vector 319 represents a parameterized prediction of translation vector 307A. Parameterized rotation vector 317 and parameterized translation vector 319 are passed to rotation engine 103 and translation engine 105 respectively.

Rotation engine 103 converts parameterized rotation vector 317 into non-parameterized rotation vector 305B. Non-parameterized rotation vector 305B represents the prediction of rotation vector 305A. Similarly, translation engine 105 converts parameterized translation vector 319 into non-parameterized rotation vector 307B. Non-parameterized translation vector 307B represents the prediction of translation vector 307A.

In an implementation, machine learning model 101 updates image data 315 based on non-parameterized rotation vector 305B and non-parameterized translation vector 307B. As a result, machine learning model 101 outputs an updated version of input image 313 that includes a cuboid around object 301. The cuboid is representative of an outline of a cube, surrounding object 301, that is generated based on at least non-parameterized rotation vector 305B and non-parameterized translation vector 307B.

Figure 4:
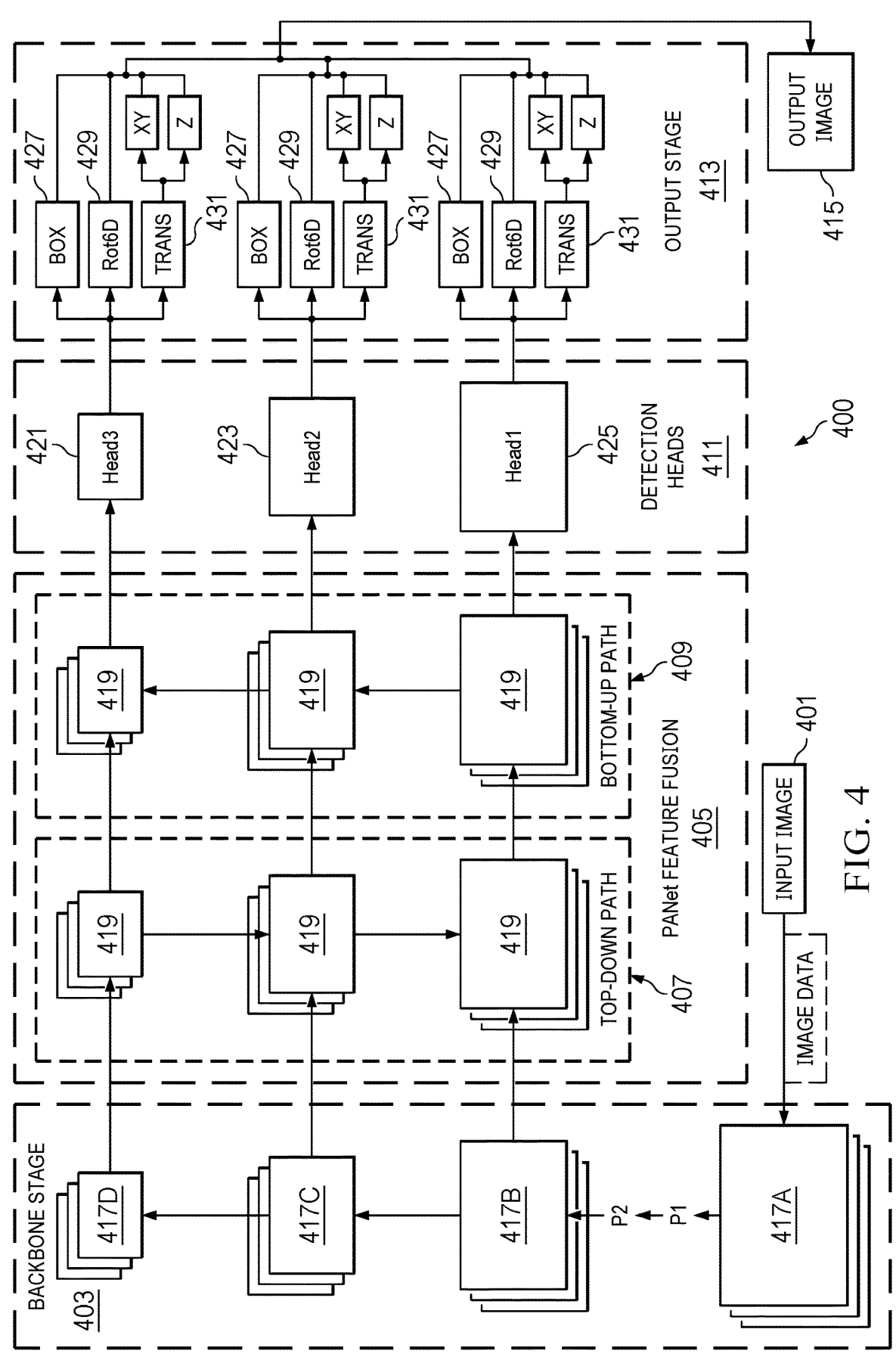
FIG. 4 illustrates a machine learning model architecture in an implementation.

FIG. 4 illustrates an architectural diagram of a machine learning model trained to perform 6D object pose estimation, herein referred to as architectural diagram 400. Architectural diagram 400 is an example of a you-only-look-once (YOLO) machine learning model. Meaning, architectural diagram 400 is representative of end-to-end approach for performing object detection and pose estimation. Architectural diagram 400 is comprised of multiple stages, each performing a different functionality, including first stage 403, second stage 405, third stage 411, and fourth stage 413. In an implementation, architectural diagram 400 represents the architecture of machine learning model 101. In operation, architectural diagram 400 receives input image 401, in the form of image data, to detect objects captured by input image 401. In turn, architectural diagram 400 produces output image 415, such that output image 415 is indicative of the detected objects.

First stage 403, also referred to as the backbone stage, is representative of the layers of the machine learning model which extract image features from the received input. For example, image features may include aspects of the image such as shapes, textures, edges, or features of the like. First stage 403 includes layer sets 417A, 417B, 417C, and 417D.

Layer sets 417A-D represent sets of layers which extract image features at different resolutions. Layer sets 417A-D deliver generated output to second stage 405.

Second stage 405, also referred to as the neck stage, is representative of a path aggregation network (PANet). Second stage 405 is comprised of two paths including top-down path 407 and bottom-up path 409. Top-down path 407 and bottom-up path 409 are comprised of layers 419. Layers 419 are configured to mix and aggregate the image features at different resolutions. The final output of layers 419 are delivered to third stage 411.

Third stage 411, also referred to as the head stage, is representative of the stage that identifies information required to form predictions. More specifically the third stage identifies information to predict parameterized rotation vectors, parameterized translation vectors, and bounding box placements for each object captured by input image 401. Third stage 411 includes detection head 421, detection head 423, and detection head 425. Detection heads 421, 423, and 425 gather information regarding the parameterized vectors and bounding box placements at varied resolutions. Each of detection heads 421, 423, and 425 may represent a different scale of the image. Outputs of detection heads 421, 423, and 425 are passed to fourth stage 413.

Fourth stage 413, also referred to as the output stage, is representative of the stage that predicts the parameterized vectors and the bounding box placements for the objects captured by input image 401. Fourth stage 413 includes box detection heads 427, rotation detection heads 429, and translation detection heads 431. Thus, for each detection head, the network includes two extra heads for predicting the rotation and translation of an object. Fourth stage 413 includes multiples of the different detection heads to generate predictions at different resolutions.

Box detection heads 427 are representative of the detection heads which form bounding box predictions for the objects captured by input image 401. In an implementation, the bounding box is representative of a box that outlines a respective object in the image. Box detection heads 427 receive information regarding the bounding box placement from third stage 411.

Rotation detection heads 429 are representative of the detection heads which predict parameterized rotation vectors for the objects of input image 401. Rotation detection heads 429 receive information from third stage 411 to predict the parameterized rotation vectors. The parameterized rotation vectors are comprised of six elements which are representative of each object's rotation. In an implementation, rotation detection heads 429 are further configured to convert the parameterized rotation vectors into non-parameterized rotation vectors. Non-parameterized rotation vectors include three parameters that predict the object's rotation in the X-, Y-, and Z-dimensions.

Translation detection heads 431 are representative of the detection heads which predict parameterized translation vectors for the objects of input image 401. Translation detection heads 431 receive information from third stage 411 to predict the parameterized translation vectors. In an implementation, translation detection heads 431 predict the parameterized translation elements with respect to the X- and Y-dimensions separately from predicting the parameterized translation element with respect to the Z-dimension. Results of the separate predictions are combined to form the parameterized translation vector. In an implementation, translation detection heads 431 are further configured to convert the parameterized translation vectors into non-parameterized translation vectors. Non-parameterized translation vectors include three parameters that predict the object's translation (i.e., position) in the X-, Y-, and Z-dimensions.

In an implementation, fourth stage 413 merges the output of box detection heads 427, rotation detection heads 429, and translation detections heads 431, to generate a vector containing parameters related to the bounding box placement and the parameterized vectors. For example, for each detected object or anchor, the following vector may be produced:

$$[C_x, C_y, W, H, box_{conf}, class, r_{11}, r_{12}, r_{13}, r_{21}, r_{22}, r_{23}, t_x, t_y, t_z]$$

Such that $C_x$ and $C_y$ represent the X- and Y-parameters for a center of a bounding box, W and H represent the width and height of the bounding box, $box_{conf}$ represents the confidence score of the bounding box, $r_{11}$, $r_{12}$, $r_{13}$, $r_{21}$, $r_{22}$, and $r_{23}$ represent the parameterized rotation parameters, and $t_x$, $t_y$, and $t_z$ represent the parameterized translation parameters.

In an implementation, fourth stage 413 merges the output of box detection heads 427, rotation detection heads 429, and translation detections heads 431, to generate a vector containing parameters related to the bounding box placement and the non-parameterized vectors. For example, for each detected object the following vector may be produced:

$$[C_x, C_y, W, H, box_{conf}, class, R_x, R_y, R_z, T_x, T_y, T_z]$$

Such that $R_x, R_y,$ and $R_z$ represent the non-parameterized rotation parameters and $T_x, T_y,$ and $T_z$ represent the non-parameterized rotation parameters.

In an implementation the vector produced by fourth stage 413 is applied to the image data of input image 401 to generate output image 415. Output image 415 is a representation of input image 401 that includes a cuboid for each object in the image, such that each cuboid is based on the corresponding vector produced by fourth stage 413. The cuboid for an object is representative of a cube that outlines the respective object in the image.

In another implementation the vector produced by fourth stage 413 may be passed along to an associated system. For example, a computer vision system that implements a robotic arm to pick up objects. To improve the accuracy of such a system, a prediction regarding the rotation and translation parameters of the object allow the robotic arm to more accurately locate the object in space.

Figure 5A:
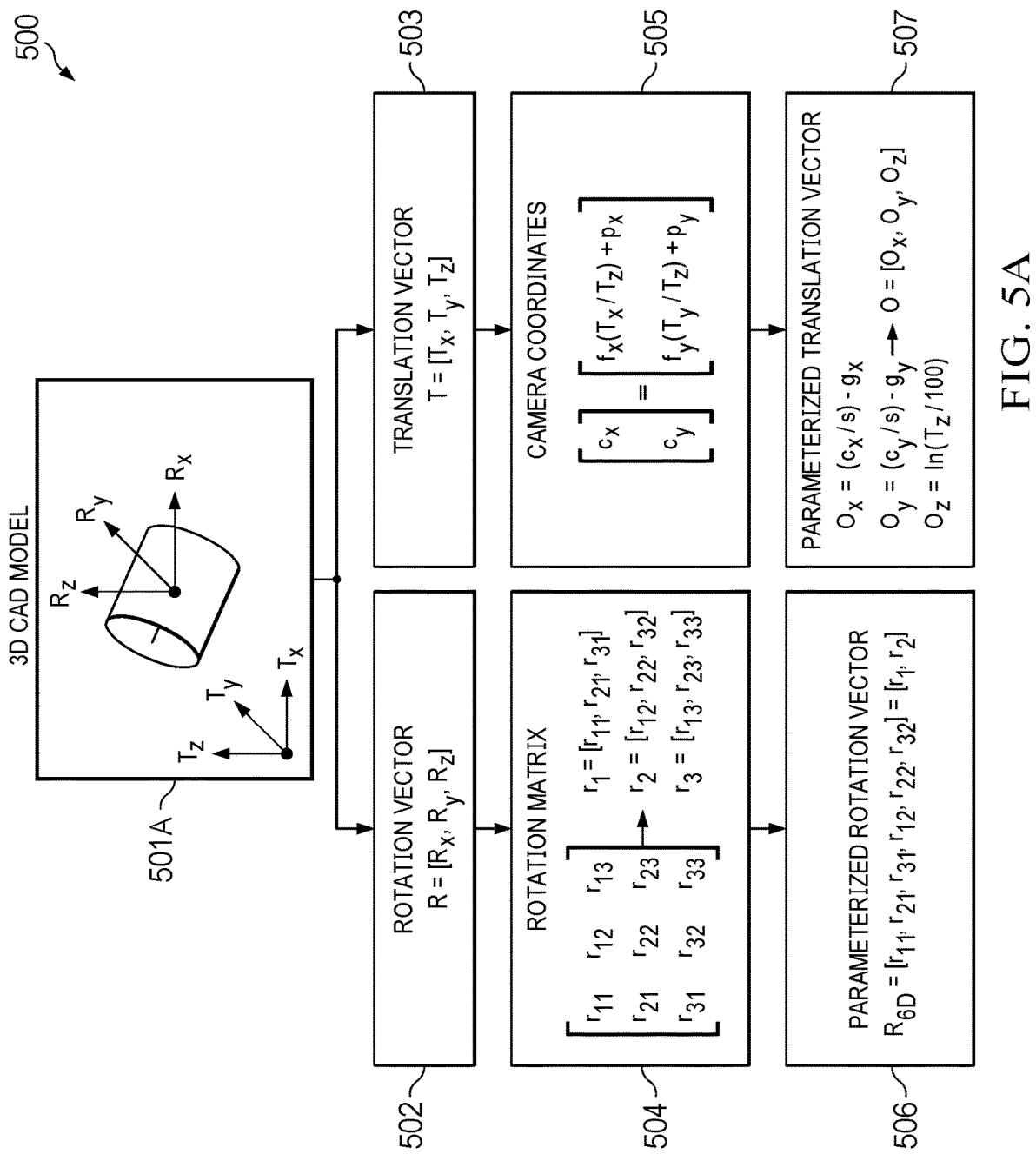
FIGS. 5A-5B illustrate a model training process in an implementation.
Figure 5B:
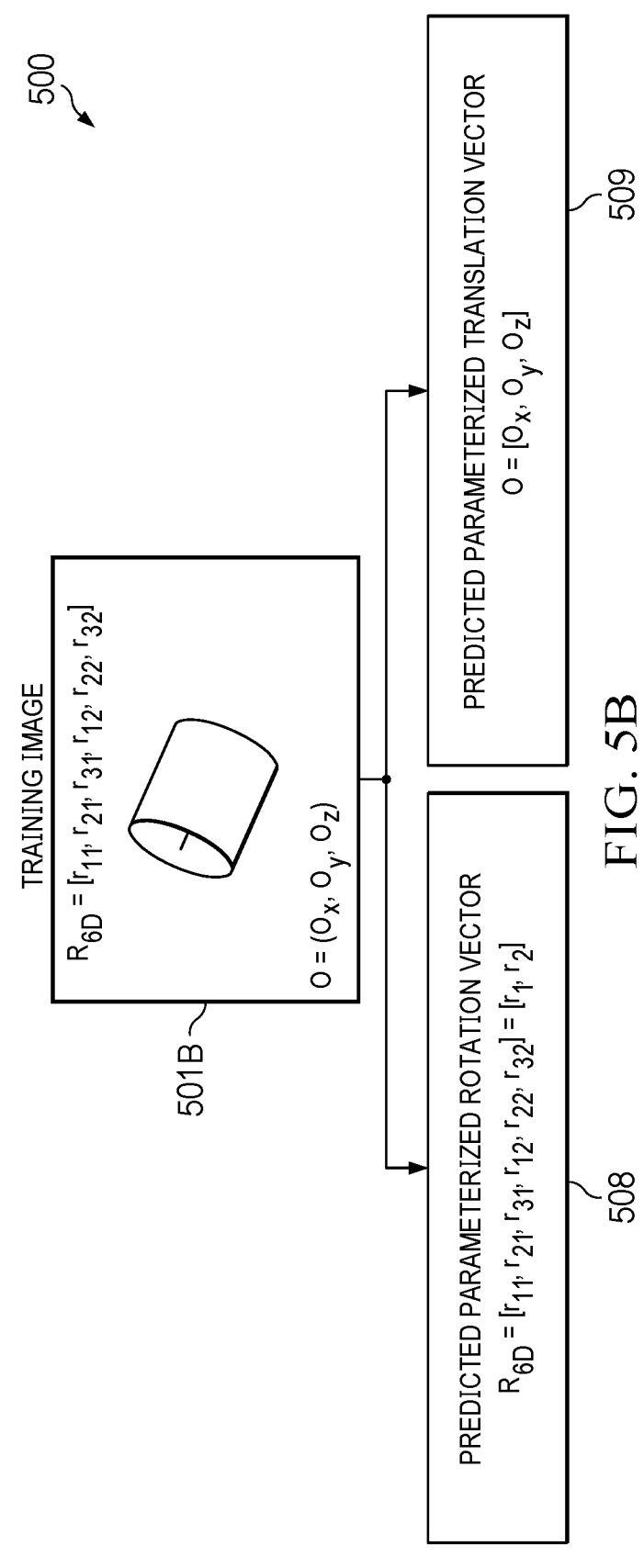

FIGS. 5A and 5B illustrate training process 500 for training a machine learning model to perform 6D object pose detection. Training process 500 may be implemented in the context of program instructions that, when executed by a suitable processing system (e.g., computing device 801), direct the processing circuitry to operate as follows, referring parenthetically to the steps in FIGS. 5A-5B.

Prior to execution of training process 500, the suitable processing system receives an input image representative of a 3D CAD model of a training object, herein referred to as input model 501A. For the purposes of explanation, input model 501A depicts a candle, tilted on its axis, at some point in space. This specification is not meant to limit the aspects of the described disclosure, but rather provide an example. As such input model 501A may be representative of any 3D object with a corresponding CAD model. Further, input model 501A may contain multiple 3D objects.

To begin execution of training process 500, the processing circuitry of the suitable computing system first identifies a rotation vector and a translation vector for the candle as it is represented by input model 501A (step 502 and step 503 respectively). The identified rotation vector describes the actual rotation parameters of the candle as it is represented by input model 501A. Similarly, the identified translation vector describes the actual translation parameters of the candle as it is represented by input model 501A.

Upon identifying the rotation vector of the candle, $R=[R_x, R_y, R_z]$, the processing circuitry then determines a rotation matrix for the candle based on the identified rotation parameters (step 504). In an implementation the rotation matrix may be calculated through the following matrix multiplication:

$$\begin{bmatrix} 1 & 0 & 0 \\ 0 & \cos(R_x) & -\sin(R_x) \\ 0 & \sin(R_x) & \cos(R_x) \end{bmatrix} * \begin{bmatrix} \cos(R_y) & 0 & \sin(R_y) \\ 0 & 1 & 0 \\ -\sin(R_y) & 0 & \cos(R_y) \end{bmatrix} *$$

$$\begin{bmatrix} \cos(R_z) & -\sin(R_z) & 0 \\ \sin(R_z) & \cos(R_z) & 0 \\ 0 & 0 & 1 \end{bmatrix} = \begin{bmatrix} r_{11} & r_{12} & r_{13} \\ r_{21} & r_{22} & r_{23} \\ r_{31} & r_{32} & r_{33} \end{bmatrix}$$

Such that results of the matrix multiplication are representative of parameterized rotation parameters. In an implementation, the processing circuitry identifies the first two columns of the rotation matrix as the actual parameterized rotation vector for the candle as it is represented by input model 501A (step 506). For example, the processing circuitry identifies the actual parameterized rotation vector as $R_{6D}[r_{11}, r_{21}, r_{31}, r_{12}, r_{22}, r_{32}]$.

Alternatively, upon the processing circuitry identifying the translation vector of the candle, $T=[T_x, T_y, T_z]$, the processing circuitry will then determine the translation parameters of the candle with respect to an associated camera's coordinate system. In an implementation, the translation parameters may be represented with respect to the associated camera's coordinate system with the following equation:

$$\begin{bmatrix} c_x \\ c_y \end{bmatrix} = \begin{bmatrix} f_x\left(\dfrac{T_x}{T_z}\right) + p_x \\ f_y\left(\dfrac{T_y}{T_z}\right) + p_y \end{bmatrix}$$

Such that $c_x$ and $c_y$ represent a projection of the translation vector onto the input image, $f_x$ and $f_y$ represent the focal length of the camera in the X- and Y-dimensions, and $p_x$ and $p_y$ represent the principal axis of the camera in the X- and Y-dimensions.

Upon projecting the translation parameters onto the input image, the processing circuitry then determines the parameterized translation vector for the candle (step 507). For example, the parameterized translation vector may be found with the following equations:

$$O_x = \frac{c_x}{s} - g_x, \, O_y = \frac{c_y}{s} - g_y, \, O_z = \ln\left(\frac{T_z}{100}\right)$$

$$O = [O_x, O_y, O_z]$$

Such that $g_x$ and $g_y$ represent the grid center in the X- and Y-dimensions, and s represents the stride.

As a result of the steps shown in FIG. 5A, the processing circuitry is able to determine the actual parameterized rotation vector and the actual parameterized translation vector for the candle of input model 501A. Meaning, the processing circuitry calculates the actual parameterized vectors based on the rotation and translation parameters of the candle within the 3D CAD model. In an implementation the 3D CAD model is adjusted to a variety of parameters to increase the training data of the machine learning model, later discussed with reference to FIGS. 6A-6C.

Prior to continuing training process 500, the processing circuitry must generate a training image representative of input model 501A. For example, the processing circuitry may produce training image 501B of FIG. 5B. Training image 501B is an image representation of input model 501A such that the rotation parameters and translation parameters of the candle represented by training image 501B are identical to the parameters of the candle represented by input model 501A. In an implementation, training image 501B is labeled to include the actual parameterized rotation vector and the actual parameterized translation vector deduced in FIG. 5A. This identification is included to test the accuracy of the machine learning model in training.

When training, the machine learning model receives training image 501B and predicts a parameterized rotation vector and a parameterized translation vector for the candle as it is represented by training image 501B (step 508 and step 509 respectively). In implementation the predicted outputs of the machine learning model are passed to a comparator to compare the predicted parameterized vectors with the actual parameterized vectors. If the comparator returns feedback of a poor prediction, the machine learning model will adjust accordingly. In an implementation, steps 502-509 are repeated until the machine learning model is accurately predicting the parameterized rotation and translation vectors for the objects of the training images.

Figure 5C:
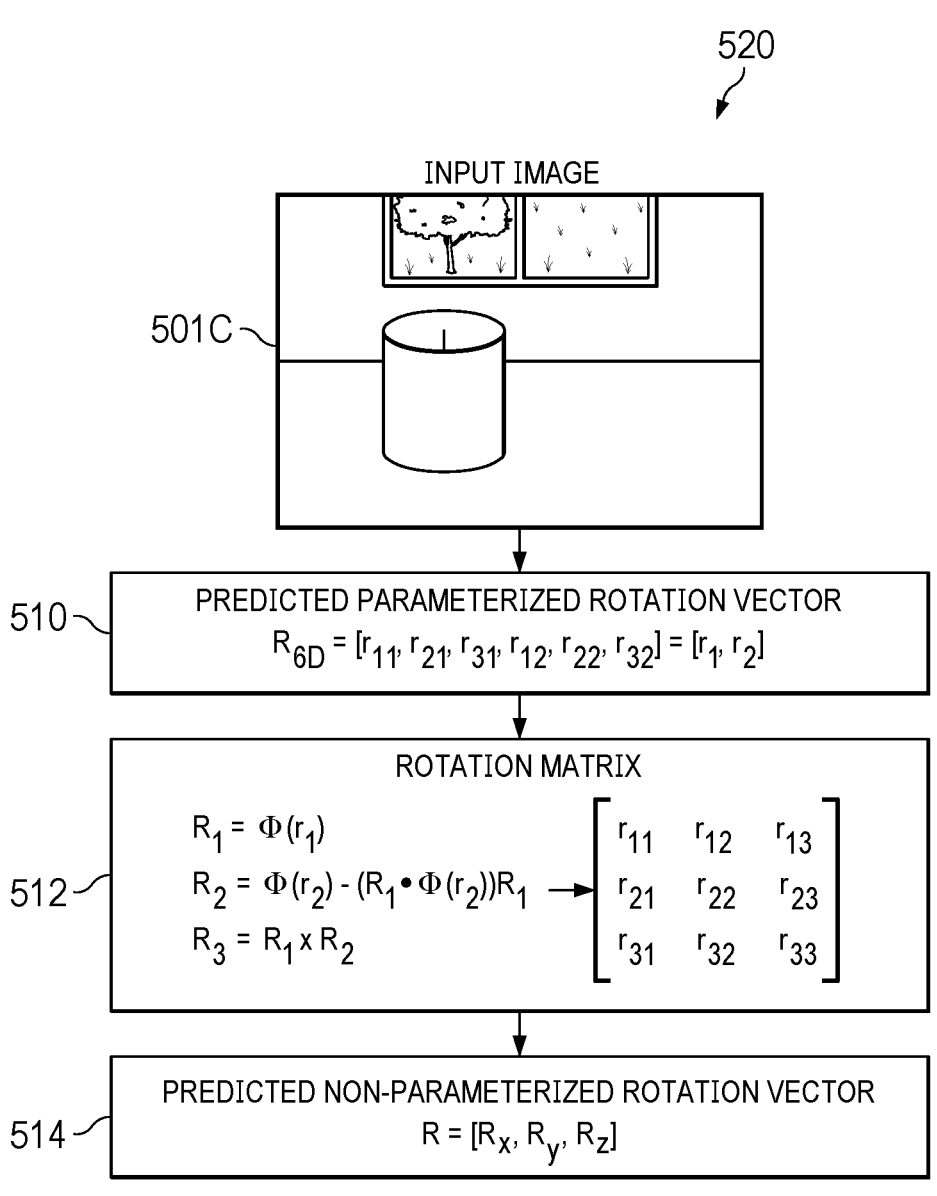
FIGS. 5C-5D illustrate a model inference process in an implementation.
Figure 5D:
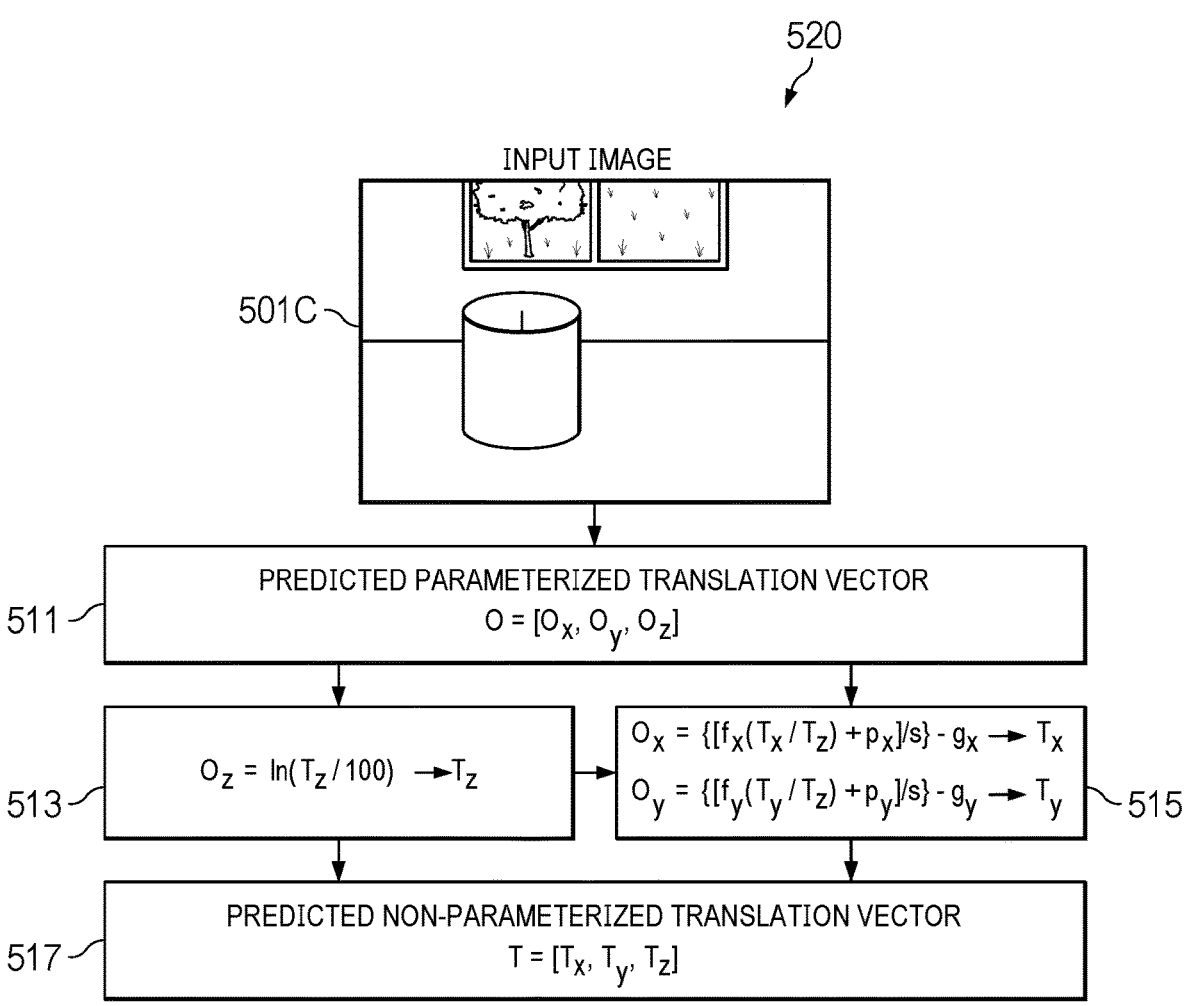

Turning to the next figures, FIGS. 5C and 5D illustrate inference process 520 for deploying a trained machine learning model. Inference process 520 may be implemented in the context of program instructions (e.g., machine learning model 101) that, when executed by a suitable processing system (e.g., computing device 801), direct the processing circuitry to operate as follows, referring parenthetically to the steps in FIGS. 5C and 5D. During inference process 520, a parameterized version of the 6D pose is predicted. This parameterized version can be decoded to obtain a final pose including a final rotation and translation vector.

Prior to execution of inference process 520, the suitable processing system receives an input image of an object, herein referred to as input image 501C. For the purposes of explanation, input image 501C depicts the candle of input model 501A and training image 501B. This specification is not meant to limit the aspects of the described disclosure, but rather provide an example. As such input image 501C may be representative of any 3D object. Further, input image 501C may contain multiple 3D objects.

To begin execution of inference process 520, the trained machine learning model of training process 500 predicts a parameterized rotation vector for the candle of input image 501C (step 510). In an implementation, the predicted parameterized rotation vector is passed to a rotation engine (i.e., rotation engine 103) to convert the predicted parameterized rotation vector into a non-parameterized rotation vector such that the following steps are taken to convert the predicted parameterized rotation vector into a non-parameterized prediction.

First the processing circuitry calculates a rotation matrix based on the predicted parameterized rotation vector, $R_{6D}[r_{11}, r_{21}, r_{31}, r_{12}, r_{22}, r_{32}]$(step 512). In an implementation the rotation matrix may be calculated with the following equations, where $\Phi(.)$ denotes a vector normalization operation:

$$R_1 = \Phi(r_1)$$

$$R_1 = \Phi([r_{11}, r_{21}, r_{31}]) = [x_{11}, x_{21}, x_{31}]$$

$$R_1 = [x_{11}, x_{21}, x_{31}]$$

$$R_2 = \Phi(r_2) - (R_1 \cdot \Phi(r_2))R_1$$

$$R_2 = \Phi([r_{12}, r_{22}, r_{32}]) - \{[x_{11}, x_{21}, x_{31}] \cdot \Phi([r_{12}, r_{22}, r_{32}])\} \\ [x_{11}, x_{21}, x_{31}]$$

$$R_2 = [y_{12}, y_{22}, y_{32}] - \{[x_{11}, x_{21}, x_{31}] \cdot [y_{12}, y_{22}, y_{32}]\} [x_{11}, x_{21}, \\ x_{31}]$$

$$R_2 = [y_{12}, y_{22}, y_{32}] - n[x_{11}, x_{21}, x_{31}] = [x_{12}, x_{22}, x_{32}]$$

$$R_2 = [x_{12}, x_{22}, x_{32}]$$

$$R_3 = R_1 \times R_2$$

$$R_3 = [x_{11}, x_{21}, x_{31}] \times [x_{12}, x_{22}, x_{32}] = [x_{13}, x_{23}, x_{33}]$$

$$R_3 = [x_{13}, x_{23}, x_{33}]$$

Such that $R_1 = [x_{11}, x_{21}, x_{31}]$ is representative of a first column of the rotation matrix, $R_2 = [x_{12}, x_{22}, x_{32}]$ is representative of a second column of the rotation matrix, and $R_3 = [x_{13}, x_{23}, x_{33}]$ is representative of a third column of the rotation matrix, as shown below:

$$[R_1, R_2, R_3] = \begin{bmatrix} x_{11} & x_{12} & x_{13} \\ x_{21} & x_{22} & x_{23} \\ x_{31} & x_{32} & x_{33} \end{bmatrix}$$

Upon identifying the rotation matrix, $[R_1, R_2, R_3]$, the processing circuitry then determines a prediction for the non-parameterized rotation vector (step 514). In an implementation, the processing circuitry determines the predicted non-parameterized vector by performing a reverse operation of the calculations described with reference to step 504 of training process 500. The predicted non-parameterized vector, $R = [R_x, R_y, R_z]$, represents a prediction for the rotation parameters of the candle.

As a result of the steps shown in FIG. 5C, the processing circuitry is able to form a parameterized and non-parameterized prediction for a 2D image of a 3D object. Meaning, the processing circuitry has generated an accurate prediction for the rotation of the object in space.

Now turning to FIG. 5D, next the trained machine learning model predicts a parameterized translation vector for the candle of input image 501C (step 512). In an implementation, the predicted parameterized translation vector is passed to a translation engine (i.e., translation engine 105) to convert the predicted parameterized translation vector into a non-parameterized translation vector such that the following steps are taken to convert the predicted parameterized translation vector into a non-parameterized prediction.

First the processing circuitry calculates a non-parameterized translation parameter with respect to the Z-dimension (step 513). In an implementation, this non-parameterized translation parameter is calculated based on the corresponding parameterized parameter of the predicted parameterized translation vector, $O = [O_x, O_y, O_z]$. For example, the non-parameterized translation parameter with respect to the Z-dimension may be calculated with the following equation:

$$T_z = 100 e^{O_z}$$

Next the processing circuitry calculates non-parameterized translation parameters with respect to the X- and Y-dimensions (step 515). In an implementation, these non-parameterized translation parameters are calculated based on the corresponding parameterized parameters of the predicted parameterized translation vector, $O = [O_x, O_y, O_z]$. For example, the non-parameterized translation parameter with respect to the X- and Y-dimensions may be calculated with the following equations:

$$T_x = \left[ \frac{(O_x - g_x)s}{f_x} - p_x \right] T_z$$

$$T_y = \left[ \frac{(O_y - g_y)s}{f_y} - p_y \right] T_z$$

Such that $g_x$ and $g_y$ represent the grid center in the X- and Y-dimensions, s represents the stride, $f_x$ and $f_y$ represent the focal length of the camera in the X- and Y-dimensions, and $p_x$ and $p_y$ represent the principle axis of the camera in the X- and Y-dimensions.

Finally, the processing circuitry combines the outputs of the previous steps to generate a prediction for the non-parameterized translation vector (step 517). The predicted non-parameterized translation vector, $T = [T_x, T_y, T_z]$, represents a prediction for the translation parameters of the candle. As a result of the steps shown in FIG. 5D, the processing circuitry is able to form a parameterized and non-parameterized prediction for a 2D image of a 3D object. Meaning, the processing circuitry has generated an accurate prediction for the position of the object in space.

In an implementation, the processing circuitry utilizes the predicted parameterized and non-parameterized vectors to generate an output image indicative of the machine learning model's predictions. For example, the machine learning model may output an image which includes a cuboid around the object such that the placement of the cuboid is based on the predicted vectors. In another implementation, the processing circuitry utilizes the predicted vectors to provide information regarding the object's location and orientation to an associated system. For example, a robotic system that includes an arm that picks up objects.

Figure 6A:
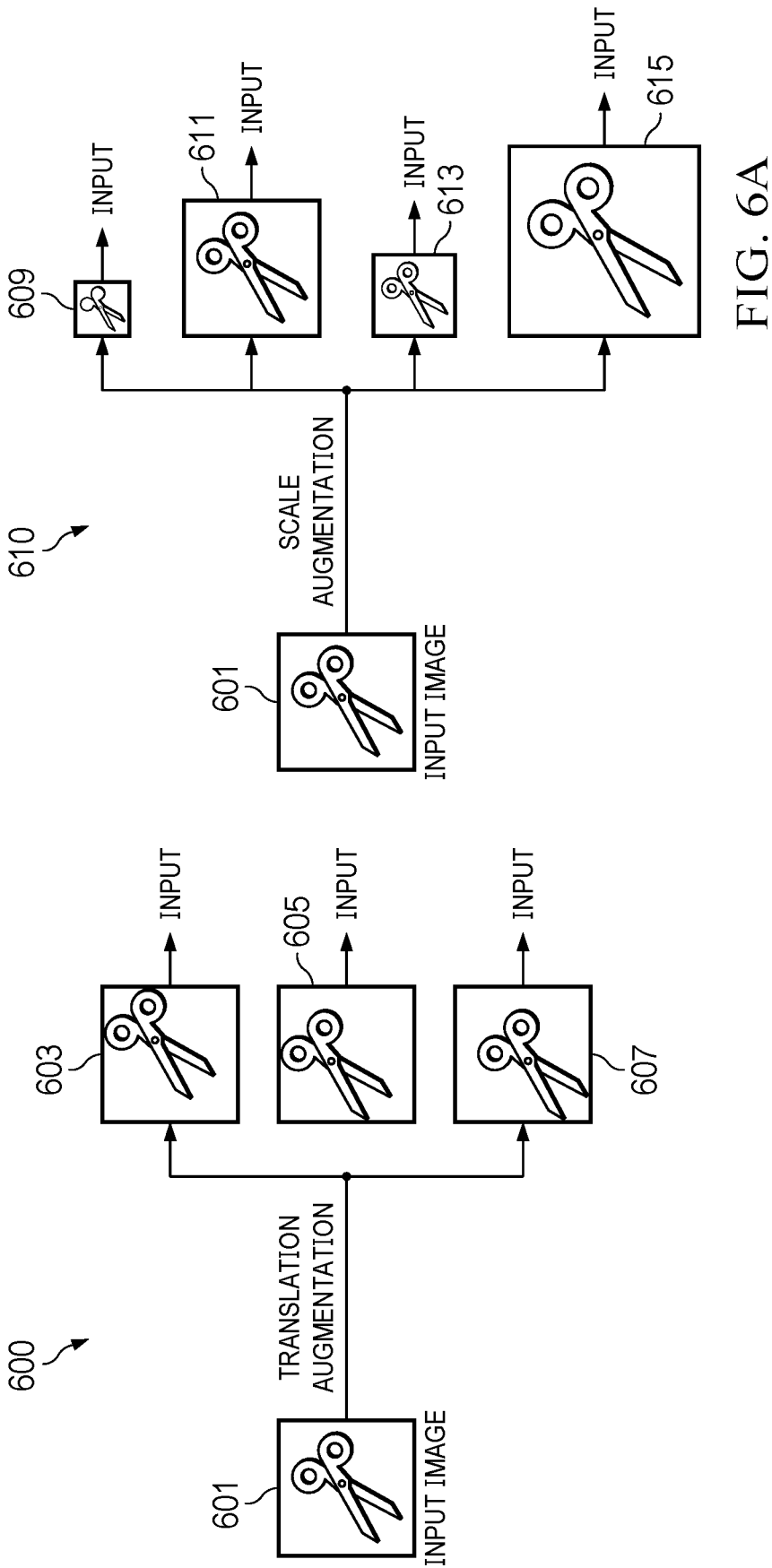
FIGS. 6A-6C illustrate an augmentation process in an implementation.
Figure 6B:
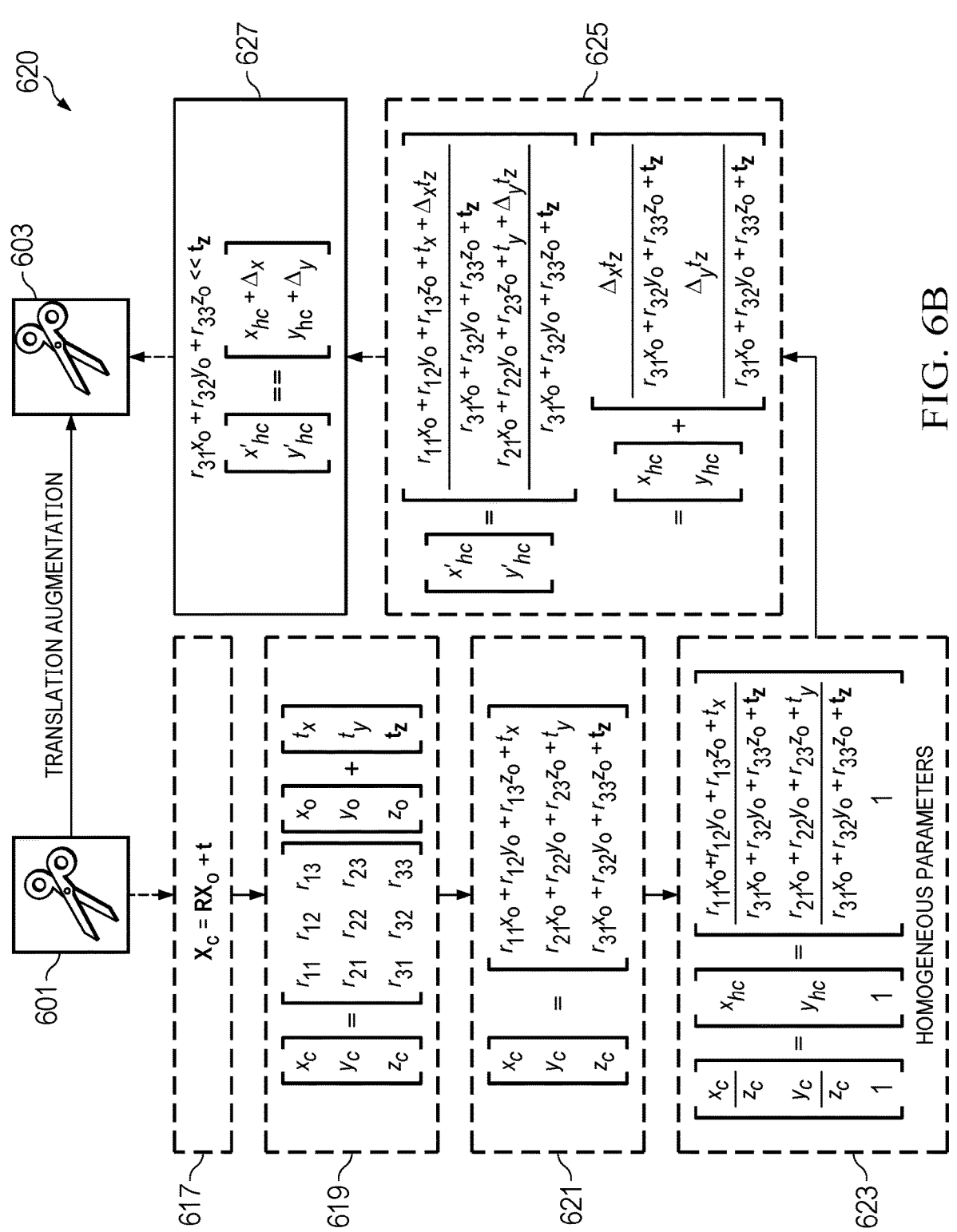
Figure 6C:
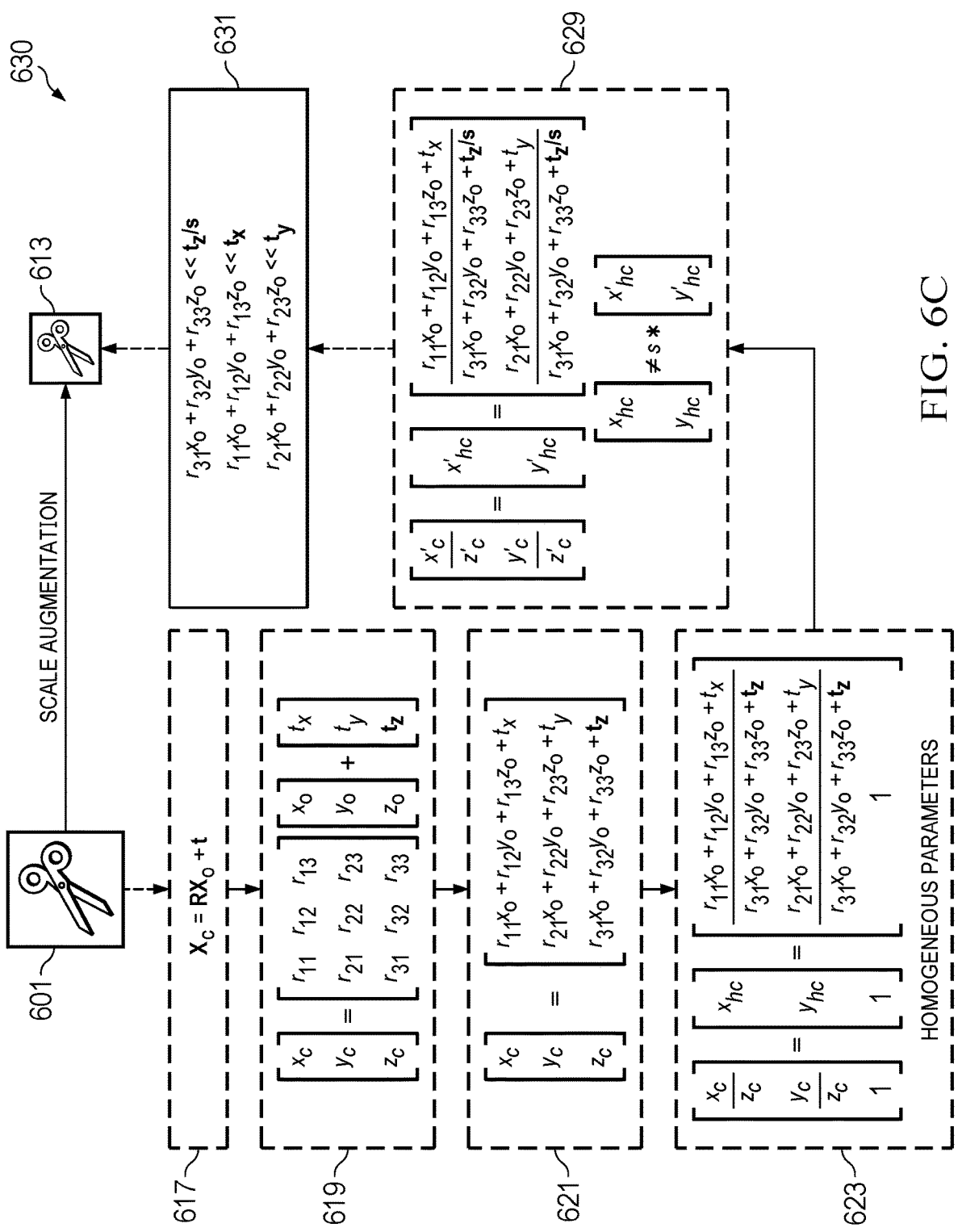

Now turning to the next Figures, FIGS. 6A-6C illustrate augmentation processes that may be employed during the training of an untrained machine learning model (i.e., training process 500). FIG. 6A illustrates the inputs and outputs related to a translation augmentation process and scale augmentation process, later discussed with reference to FIGS. 6B and 6C. The augmentation processes disclosed herein are applied during the training phase of the machine learning model to increase the amount of training data (i.e., training data 121). Example inputs and outputs of the augmentation processes include translation augmentation data 600 and scale augmentation data 610.

Translation augmentation data 600 is representative of the inputs and outputs related to translation augmentation process 620 of FIG. 6B. In an implementation, translation augmentation data 600 is used as training data for an untrained machine learning model. Translation augmentation data 600 includes input image 601, output image 603, output image 605, and output image 607. Input image 601 is representative of an un-translated image of an object that may be used as input to train a machine learning model. Output images 603, 605, and 607 are representative of translated versions of input image 601. In an implementation, input image 601 is translated via translation augmentation process 620, to generate output images 603, 605, and 607. Output images 603, 605, and 607 may then be used as input to train a machine learning model.

Scale augmentation data 610 represents the inputs and outputs related to scale augmentation process 630 of FIG.

6C. In an implementation, scale augmentation data 610 is used as training data for an untrained machine learning model. Scale augmentation data 610 includes input image 601, output image 609, output image 611, output image 613 and output image 615. Input image 601 is further representative of an un-scaled image of an object that may be used as input to train a machine learning model. Output images 609, 611, 613 and 615 are representative of scaled versions of input image 601. In an implementation, input image 601 is scaled via scale augmentation process 630, to generate output images 609, 611, 613 and 615. Output images 609, 611, 613 and 615 may then be used as input to train a machine learning model.

Now turning to the next Figure, FIG. 6B illustrates translation augmentation process 620. Translation augmentation process 620 may be implemented in the context of program instructions that, when executed by a suitable processing system (e.g., computing device 801), direct the processing circuitry to operate as follows, referring parenthetically to the steps in FIG. 6B.

To begin execution of translation augmentation process 620, the processing circuitry receives input image 601 from an associated camera. Next, the processing circuitry determines a ground truth pose for the object captured by input image 601 with respect to the associated camera's frame of reference (step 617-621). Next, the processing circuitry determines the homogeneous parameters for the object based on the ground truth pose (step 623). From the homogeneous parameters, the processing circuitry may randomly translate the image horizontally or vertically, such that the corresponding object parameters are also adjusted (step 625).

Finally, the processing circuitry checks if newly adjusted parameters satisfy restrictions 627. If restrictions 627 are satisfied, the processing circuitry outputs output image 603. In an implementation, translation augmentation process 620 is repeated to produce different translations of input image 601 (e.g., output images 603, 605, and 607). Translation augmentation process 620 may be executed for each image of the training set to expand the inputs of the untrained machine learning model.

FIG. 6C illustrates scale augmentation process 630. Scale augmentation process 630 may be implemented in the context of program instructions that, when executed by a suitable processing system (e.g., computing device 801), direct the processing circuitry to operate as follows, referring parenthetically to the steps in FIG. 6C. Scale augmentation process 630 may be configured to use a low value of scale augmentation.

In an implementation, execution of scale augmentation process 630 begins with the same steps as translation augmentation process 620, such that steps 617-623 are identical. For example, to begin execution of scale augmentation process 630, the processing circuitry first receives input image 601. Next, the processing circuitry determines a ground truth pose for the object captured by input image 601 with respect to the associated camera's frame of reference (step 617-621). The processing circuitry may be configured to normalize the ground truth depth and then perform a logarithm operation on this normalized quantity. Then, the processing circuitry determines the homogeneous parameters for the object based on the ground truth pose (step 623). From the homogeneous parameters, instead of performing translation augmentation, the processing circuitry scales the image by a factor of s (step 629).

Finally, the processing circuitry checks if the newly adjusted homogeneous parameters satisfy restrictions 631. If restrictions 631 are satisfied, the processing circuitry outputs output image 613. In an implementation, scale augmentation process 630 is repeated to produce different scales of input image 601 (e.g., output images 609, 611, 613 and 615). Scale augmentation process 630 may be executed for each image of the training set to expand the inputs of the untrained machine learning model.

FIG. 7 illustrates composite loss function 701 that may be implemented during the training of a machine learning model to determine the accuracy of the model's predictions. In an implementation, composite loss function 701 determines if a machine learning model accurately predicts parameterized rotation vectors and parameterized translation vectors for objects represented by the training images. Composite loss function 701 is comprised of four loss parameters that include loss parameters for describing the loss of either a symmetric or an asymmetric object (i.e., $L_{ADD(S)}$), the rotation loss of said symmetric or asymmetric object (i.e., $L_{rot}$), the translation loss of said object (i.e., $L_{oks}$), which may be a version of Object Keypoint Similarity (OKS), and the absolutive relative difference loss of said object (e.g., $L_{ARD}$). In an implementation, composite loss function 701 is implemented via a comparator (i.e., comparator 125) to determine the accuracy of a machine learning model's predictions.

Loss parameters of composite loss function 701 are further defined with equations 703, equation 705, equation 707, and equation 709. Equations 703 define the loss equations for symmetric and asymmetric objects. In an implementation, when the training image comprises a symmetric object, composite loss function 701 will form using the symmetric loss equation. Alternatively, when the training image comprises an asymmetric object, composite loss function 701 will form using the asymmetric loss equation. Equation 705 defines the loss equation for rotation loss. Meaning, equation 705 determines the accuracy of the model's parameterized rotation vector predictions. Equation 707 defines the loss equation for translation loss. In an implementation equation 707 defines the translation loss for the X- and Y-dimensions. Meaning, equation 707 determines the accuracy of the model's parameterized translation vector predictions with respect to the X- and Y-dimensions. Equation 709 defines the loss equation for the absolute relative difference loss. In an implementation equation 709 defines the translation loss for the Z-dimension. Meaning, equation 709 determines the accuracy of the model's parameterized translation vector predictions with respect to the Z-dimension.

Figure 8:
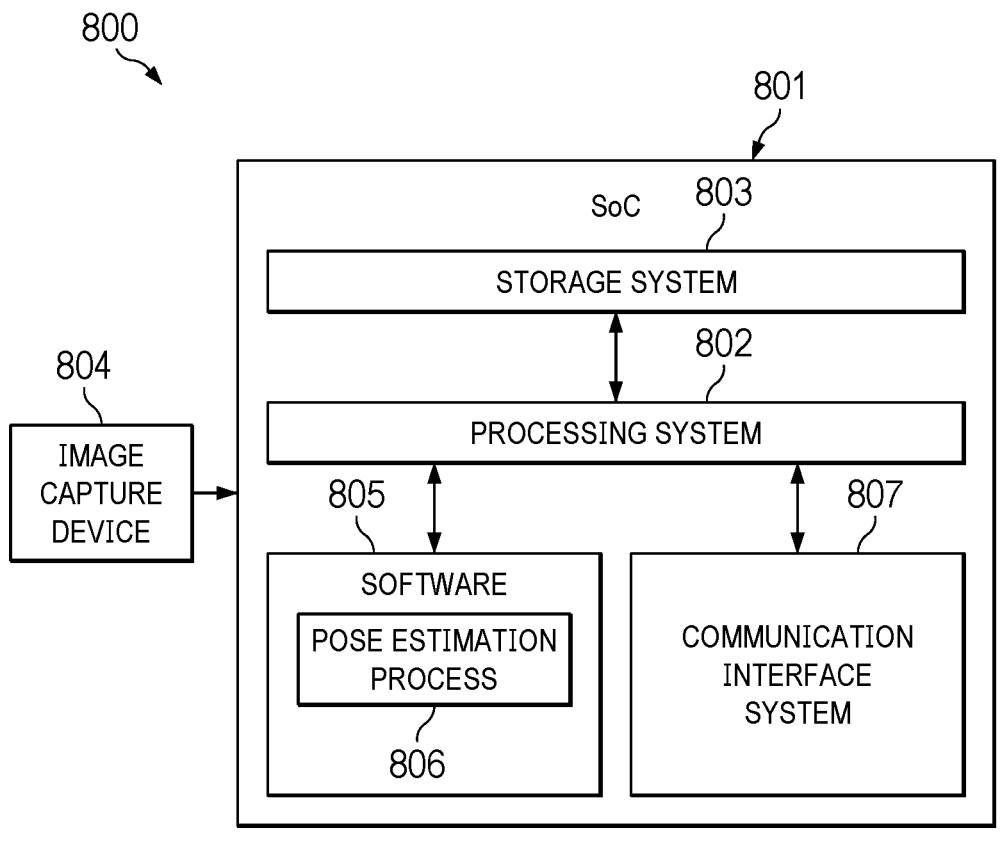
FIG. 8 illustrates a computing system suitable for implementing the various operational environments, architectures, processes, scenarios, and sequences discussed below with respect to the other Figures.

Turning now to FIG. 8, architecture 800 illustrates computing device 801 operatively coupled to image capture device 804. Architecture 800 is representative of any system or collection of systems in which the various processes, programs, services, and scenarios disclosed herein may be implemented. Examples of computing device 801 include, but are not limited to, general purpose computers, application specific computers such as automotive computers or aerospace computers, embedded computers, industrial computers, server computers, MCUs, and personal computers. One specific example of a computing platform includes the Jacinto 7 from Texas Instruments. Examples of image capture device 804 include a camera, an imaging system, a computer vision system, or any system which incorporates a camera. Computing device 801 receives image data from image capture device 804 to perform the processes, programs, services, and scenarios disclosed herein.

Computing device 801 may be implemented as a single apparatus, system, or device or may be implemented in a distributed manner as multiple apparatuses, systems, or devices. Computing device 801 includes, but is not limited to, processing system 802, storage system 803, software 805, and communication interface system 807. In an implementation, computing device 801 further includes a user interface system. Processing system 802 is operatively coupled with storage system 803, communication interface system 807, and user interface system 809.

Processing system 802 loads and executes software 805 from storage system 803. Software 805 includes and implements process 806, which is representative of the processes discussed with respect to the preceding Figures, such as method 200, training process 500, inference process 520, translation augmentation process 620, and translation augmentation process 630. When executed by processing system 802, software 805 directs processing system 802 to operate as described herein for at least the various processes, operational scenarios, and sequences discussed in the foregoing implementations. Computing device 801 may optionally include additional devices, features, or functions not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include one or more general purpose central processing units, graphical processing units, microprocessors, digital signal processors, field-programmable gate arrays, application specific processors, processing circuitry, analog circuitry, digital circuitry, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including process 806) may be implemented in program instructions and among other functions may, when executed by processing system 802, direct processing system 802 to operate as described with respect to the various operational scenarios, sequences, and processes illustrated herein. For example, software 805 may include program instructions for implementing the processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing device 801 is representative) overall from a general-purpose computing system into a special-purpose computing system customized to support image processing. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary, etc.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method for predicting poses of objects in images, the method comprising:
   inputting image data to a machine learning model, wherein the image data corresponds to an image of an object;
   predicting, by the machine learning model, a parameterized rotation vector for the object;
   predicting, by the machine learning model, a parameterized translation vector for the object;
   providing, by the machine learning model, the parameterized rotation vector to a rotation engine and the parameterized translation vector to a translation engine;
   generating, by the rotation engine, a rotation matrix based on the parameterized rotation vector;
   converting, by the rotation engine, the rotation matrix into a non-parameterized rotation vector;
   converting, by the translation engine, the parameterized translation vector into a non-parameterized translation vector;
   generating, by the machine learning model, an outline for surrounding the object based on the non-parameterized rotation vector and the non-parameterized translation vector; and
   updating, by the machine learning model, the image data to include the outline.

2. The method of claim 1 wherein the non-parameterized rotation vector comprises three non-parameterized rotation elements, and wherein the parameterized rotation vector comprises six parameterized rotation elements.

3. The method of claim 2 wherein the non-parameterized translation vector comprises three non-parameterized position elements, and wherein the parameterized translation vector comprises three parameterized position elements.

4. The method of claim 3 wherein to generate the rotation matrix based on the parameterized rotation vector, the method further comprises, by the rotation engine, normalizing the six parameterized rotation elements.

5. The method of claim 4 wherein to convert the parameterized translation vector into the non-parameterized translation vector, the method further comprises, by the translation engine, converting the three parameterized position elements into the three non-parameterized position elements based on characteristics of an image capture device, and wherein the characteristics of the image capture device comprise a focal length, a principal axis, and a distance of a center of the object to the image capture device.

6. The method of claim 1 further comprising training the machine learning model to predict parameterized rotation vectors and parameterized translation vectors for objects in training images.

7. The method of claim 6 further comprising, by processing circuitry, augmenting the training images including by translating the training images horizontally and vertically during the training.

8. The method of claim 7 further comprising, by the processing circuitry, applying a composite loss function to the training images during the training.

9. The method of claim 8 wherein the outline includes a cuboid that encompasses the object.

10. A computing apparatus comprising:
    one or more memory devices;
    one or more processors coupled with the one or more memory devices; and
    program instructions stored on the one or more memory devices that, when executed by the one or more processors, direct the computing apparatus to at least:
       input image data to a machine learning model, wherein the image data corresponds to an image of an object, and wherein the machine learning model is trained to predict a parameterized rotation vector for the object and a parameterized translation vector for the object;
       generate a rotation matrix based on the parameterized rotation vector;
       convert the rotation matrix into a non-parameterized rotation vector;
       convert the parameterized translation vector into a non-parameterized translation vector;
       generate an outline for surrounding the object based on the non-parameterized rotation vector and the non-parameterized translation vector; and
       update the image data to include the outline.

11. The computing apparatus of claim 10 wherein the non-parameterized rotation vector comprises three non-parameterized rotation elements, and wherein the parameterized rotation vector comprises six parameterized rotation elements.

12. The computing apparatus of claim 11 wherein the non-parameterized translation vector comprises three non-parameterized position elements, and wherein the parameterized translation vector comprises three parameterized position elements.

13. The computing apparatus of claim 12 wherein to generate the rotation matrix based on the parameterized rotation vector, the program instructions further direct the computing apparatus to normalize the six parameterized rotation elements.

14. The computing apparatus of claim 13 wherein to convert the parameterized translation vector into the non-parameterized translation vector, the program instructions further direct the computing apparatus to convert the three parameterized position elements into the three non-parameterized position elements based on characteristics of an image capture device, and wherein the characteristics of the image capture device comprise a focal length, a principal axis, and a distance of a center of the object to the image capture device.

15. The computing apparatus of claim 10 wherein the machine learning model is trained based on training data to predict parameterized rotation vectors and parameterized translation vectors for objects in training images.

16. The computing apparatus of claim 15 wherein the training data includes augmented versions of the training images, wherein the augmented versions of the training images include horizontally translated versions of the training images and vertically translated versions of the training images, and wherein the machine learning model is further trained based on a composite loss function.

17. The computing apparatus of claim 16 wherein the outline includes a cuboid that encompasses the object.

18. Processing circuitry comprising:

input circuitry configured to input image data to a machine learning model, wherein the image data corresponds to an image of an object, and wherein the machine learning model is trained to predict a parameterized rotation vector for the object and a parameterized translation vector for the object;

conversion circuitry configured to:

generate a rotation matrix based on the parameterized rotation vector;

convert the rotation matrix into a non-parameterized rotation vector; and convert the parameterized translation vector into a non-parameterized translation vector; and output circuitry configured to:

generate an outline for surrounding the object based on the non-parameterized rotation vector and the non-parameterized translation vector; and update the image data to include the outline.

19. The processing circuitry of claim 18 wherein the non-parameterized rotation vector comprises three non-parameterized rotation elements, wherein the parameterized rotation vector comprises six parameterized rotation elements, wherein the non-parameterized translation vector comprises three non-parameterized position elements, and wherein the parameterized translation vector comprises three parameterized position elements.

20. The processing circuitry of claim 19 wherein to generate the rotation matrix based on the parameterized rotation vector, the conversion circuitry is further configured to normalize the six parameterized rotation elements, wherein to convert the parameterized translation vector into the non-parameterized translation vector, the conversion circuitry is further configured to convert the three parameterized position elements into the three non-parameterized position elements based on characteristics of the input circuitry, wherein the characteristics of the input circuitry comprise a focal length, a principal axis, and a distance of a center of the object to the input circuitry, and wherein the outline includes a cuboid that encompasses the object.

* * * * *